(12) United States Patent
Zhou

(10) Patent No.: US 12,317,153 B2
(45) Date of Patent: May 27, 2025

(54) COMMUNICATION METHOD AND COMMUNICATIONS APPARATUS

(71) Applicant: Huawei Cloud Computing Technologies, Co., Ltd., Guizhou (CN)

(72) Inventor: Kai Zhou, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 888 days.

(21) Appl. No.: 17/366,760

(22) Filed: Jul. 2, 2021

(65) Prior Publication Data

US 2021/0334545 A1    Oct. 28, 2021

Related U.S. Application Data

(63) Continuation of application No. PCT/CN2020/102085, filed on Jul. 15, 2020.

(30) Foreign Application Priority Data

Sep. 30, 2019   (CN) .......................... 201910944057.X

(51) Int. Cl.
*G06V 20/54*       (2022.01)
*G06V 20/40*       (2022.01)
*G08G 1/0967*      (2006.01)
*H04W 4/024*       (2018.01)

(52) U.S. Cl.
CPC ............ *H04W 4/024* (2018.02); *G06V 20/41* (2022.01); *G06V 20/48* (2022.01); *G06V 20/54* (2022.01); *G08G 1/0967* (2013.01); *G06V 20/44* (2022.01)

(58) Field of Classification Search
CPC ....... H04W 4/024; G06V 20/54; G06V 20/41; G06V 20/48
See application file for complete search history.

(56) References Cited

U.S. PATENT DOCUMENTS

2009/0231432 A1   9/2009   Grigsy et al.
2010/0077441 A1*  3/2010   Thomas ............... H04N 21/478
                                                345/545

(Continued)

FOREIGN PATENT DOCUMENTS

| CN | 101561969 A | 10/2009 |
|----|-------------|---------|
| CN | 101860731 A | 10/2010 |
| CN | 102509467 A | 6/2012  |

(Continued)

*Primary Examiner* — Sam Bhattacharya
(74) *Attorney, Agent, or Firm* — Conley Rose, P.C.

(57) ABSTRACT

A communication method includes: obtaining information about first and second video streams, where the information about each video stream comprises evaluation information of the video stream and an address corresponding to the video stream, and both of the first and second video streams are related to a first event; selecting the first video stream for a first vehicle based on evaluation information of the first and second video streams; and sending a first message including an address corresponding to the first video stream to the first vehicle. Thus, an appropriate video stream can be matched for the vehicle, and the vehicle does not need to autonomously select a video stream. In addition, the first vehicle can learn of a complete picture of the first event.

26 Claims, 9 Drawing Sheets

(56) References Cited

U.S. PATENT DOCUMENTS

2014/0358353 A1* 12/2014 Ibanez-Guzman .. G05D 1/0027
                                                              701/23
2018/0211116 A1   7/2018 Modi et al.

FOREIGN PATENT DOCUMENTS

| CN | 104869474 A | 8/2015 |
| CN | 106060537 A | 10/2016 |
| CN | 107071342 A | 8/2017 |
| CN | 105144711 B | 10/2017 |
| CN | 107404646 A | 11/2017 |
| CN | 109624902 A | 4/2019 |
| CN | 109729348 A | 5/2019 |
| CN | 109741224 A | 5/2019 |
| CN | 109743549 A | 5/2019 |
| CN | 110062222 A | 7/2019 |
| CN | 110139073 A | 8/2019 |
| WO | 2011143941 A1 | 11/2011 |

* cited by examiner

COMMUNICATION METHOD AND COMMUNICATIONS APPARATUS

CROSS-REFERENCE TO RELATED APPLICATIONS

This is a continuation of Int'l Patent App. No. PCT/CN2020/102085, filed on Jul. 15, 2020, which claims priority to Chinese Patent App. No. 201910944057.X, filed on Sep. 30, 2019, which are incorporated by reference.

FIELD

This disclosure relates to the field of communications technologies, and in particular, to a communication method and a communications apparatus.

BACKGROUND

Currently, traffic congestion has become a major problem in a city. To alleviate traffic congestion at an intersection, a large quantity of traffic infrastructures, including traffic lights, cameras, and the like, are deployed at and near the intersection. However, the traffic congestion problem cannot be effectively resolved by simply using the traffic infrastructures to control a traffic flow or disperse vehicles in the traffic congestion.

Vehicle-to-everything (V2X), also referred to as internet of vehicles (IoV), provides a technology used by a vehicle for external information exchange. V2X includes vehicle-to-vehicle (V2V), vehicle-to-pedestrian (V2P), vehicle-to-infrastructure (V2I), vehicle-to-network (V2N), and the like, as shown in FIG. 1A. V2V refers to communication between vehicles. V2P refers to communication between a vehicle and a person (including a pedestrian, a cyclist, a driver, a passenger, or the like). V2I refers to communication between a vehicle and a network device. The network device is, for example, a roadside unit (RSU). In addition, V2N may be included in V2I, and V2N refers to communication between a vehicle and a base station/network. As an IoV technology emerges and develops, how to better use the IoV technology in transportation has become a hot research topic in the industry. It is expected to alleviate traffic congestion and improve traffic efficiency and driving experience through collaboration between vehicles and devices in the IoV.

SUMMARY

When an accident or congestion occurs on a road, if a vehicle or a passenger in a vehicle can obtain detailed information about the accident or the congestion in time, for example, obtain a picture or a video about the accident or the congestion, the vehicle can plan or change a route in time to avoid the accident or the congestion.

The vehicle or the passenger in the vehicle may actively request to obtain a picture or a video stream about a region of interest from an internet of vehicles device or a server. For example, a display is disposed in a cab of the vehicle. The display may display a map, and a plurality of cameras may be shown on the map. If a user wants to obtain a video stream photographed by a camera, the user may tap an icon of the corresponding camera on the map, so that the vehicle can receive a video photographed by the camera. However, the cameras may be deployed at different positions, and different cameras may photograph different pictures about the accident. For example, some cameras photograph pictures showing a relatively complete condition of the accident, and some cameras may photograph pictures showing only a part of the condition of the accident. The user does not know a specific position at which the accident occurs, and therefore does not know which camera photographs a picture that is worthy of a reference. In this case, the user can only sequentially obtain video streams photographed by all cameras, and know which video stream is worthy of a reference only after watching the video streams. Definitely, this requires a plurality of operations. Consequently, efficiency of obtaining a valuable video stream is relatively low. In addition, if the accident occurs suddenly, the vehicle may not be able to sequentially obtain the video streams photographed by all the cameras, and may even collide with another object. Consequently, safety is relatively poor.

Therefore, embodiments provide a communication method and a communications apparatus, to improve efficiency of obtaining a video stream about a road by a vehicle, and further improve traffic efficiency and driving safety.

According to a first aspect, a first communication method is provided, where the method includes: obtaining information about a first video stream and information about a second video stream, where information about each video stream includes evaluation information of the video stream and an address corresponding to the video stream, and the first video stream and the second video stream are video streams related to a first event; selecting the first video stream for a first vehicle based on evaluation information of the first video stream and evaluation information of the second video stream; and sending a first message to the first vehicle, where the first message includes an address corresponding to the first video stream.

The method in the first aspect may be performed by a first communications apparatus. The first communications apparatus may be a communications device or may be an apparatus, for example, a chip system, having a function that can support a communications device to implement the method. For example, the communications device is a server. For example, the server is a V2X server. For example, in the following descriptions, the first communications apparatus is a server.

In this embodiment, the first video stream may be selected for the first vehicle based on the evaluation information of the first video stream and the evaluation information of the second video stream. The first video stream may be a video stream selected after the evaluation information of the first video stream and the evaluation information of the second video stream are analyzed. For example, the first video stream is a video stream that is more appropriate for the first vehicle. In other words, by watching the first video stream, a passenger in the first vehicle can see relatively complete content about the first event. "Appropriate" means that the first video stream may be a video stream with a highest score in a plurality of video streams after the plurality of video streams are evaluated by using a specific algorithm. In this way, an appropriate video stream can be matched for the vehicle, and the vehicle does not need to autonomously select a video stream. In comparison with a manual operation, a process in which the server selects the video stream is less time-consuming, a video stream can be provided for the vehicle in time even if an accident occurs suddenly, and efficiency of obtaining a valuable video stream by the vehicle is improved. In addition, the first vehicle can learn of a complete picture of the first event, and therefore the first vehicle can effectively avoid a pedestrian, another vehicle, or the like. This reduces a collision possibility, and improves driving safety. This method in which a picture or a video stream captured by a camera is pushed to a vehicle may also be referred to as a see-through method. According to this method, a vehicle traveling on a road can obtain an image or a video stream captured by a camera deployed on a roadside.

With reference to the first aspect, in a possible implementation of the first aspect, the evaluation information of each video stream includes evaluation information of an image in the video stream, and the evaluation information of the image includes one or more of the following: integrity of the image, a deviation degree of the image, and resolution of the image. The integrity of the image is a ratio of an area of an event detection region to an area of an ROI region in the image, and the deviation degree of the image is a deviation degree of a geometric center of the event detection region in the image relative to a center position of the image.

For example, the evaluation information of the image includes the integrity of the image and the deviation degree of the image; or the evaluation information of the image includes the integrity of the image, the deviation degree of the image, and the resolution of the image. Integrity of one frame of image may be integrity of content that is about the first event and that is included in the image. For example, the integrity of the image may be a ratio of an area of an event detection region in the image to an area of an ROI region in the image. For example, if one frame of image records a relatively complete image of the first event, integrity of the image may be relatively high. If the image records only a partial image of the first event, the integrity of the image may be relatively low. The integrity of the image can be used to measure the integrity of content about the first event included in the image. Generally, if one frame of image includes more complete content about the first event, it indicates that the image is worthier to be watched by a user. The evaluation information that is of the image and that is included in information about the video stream may correspond to one or more frames of images. If the evaluation information that is of the image and that is included in the information about the video stream corresponds to the plurality of frames of images, integrity of the image may be comprehensive integrity of the plurality of frames of images. For example, integrity of the plurality of frames of images may be obtained based on integrity of each of the plurality of frames of images. A deviation degree of one frame of image may be a deviation degree of a geometric center of an event detection region in the image relative to a center position of the image. Alternatively, a deviation degree of one frame of image, may be a deviation degree of a geometric center of an event detection region included in the image relative to a center position of an ROI region in the image. Whether the content corresponding to the first event is centered in the image may be measured based on the deviation degree of the image. Generally, if the content is more centered in the image, it indicates that watching experience is better. The evaluation information that is of the image and that is included in information about the video stream may correspond to one or more frames of images. If the evaluation information that is of the image and that is included in the information about the video stream corresponds to a plurality of frames of images, a deviation degree of the image may be a comprehensive deviation degree of the plurality of frames of images. For example, a deviation degree of the plurality of frames of images may be obtained based on a deviation degree of each of the plurality of frames of images. Resolution of one frame of image may indicate definition of the image. Higher resolution of the image indicates higher definition of the image and better watching experience of a user. The evaluation information that is of the image and that is included in information about the video stream may correspond to one or more frames of images. If the evaluation information that is of the image and that is included in the information about the video stream corresponds to the plurality of frames of images, resolution of the image may be comprehensive resolution of the plurality of frames of images. For example, resolution of the plurality of frames of images may be obtained based on resolution of each of the plurality of frames of images. It can be learned that the foregoing parameters can be used to evaluate whether one or more frames of images are valuable. Therefore, one or more of the foregoing parameters may be included in the evaluation information of the image.

With reference to the first aspect, in a possible implementation of the first aspect, the evaluation information of the image in the video stream includes evaluation information of at least one frame of image in the video stream.

For example, the evaluation information of the image in the video stream may include evaluation information of one frame of image in the video stream, or may include evaluation information of a plurality of frames of images in the video stream. If evaluation information of an image in a video stream includes evaluation information of one frame of image, a representative image in the video stream may be selected as the frame of image. For example, a first frame of image in the video stream, a last frame of image in the video stream, or an intermediate frame of image in the video stream may be selected as the frame of image. Certainly, any frame of image in the video stream may alternatively be selected as the frame of image. Evaluation information of an image in a video stream needs to include only evaluation information of one frame of image. In this way, a process of obtaining the evaluation information of the image in the video stream is relatively simple, and only one frame of image needs to be analyzed. This can improve efficiency of obtaining the evaluation information of the image in the video stream. In addition, one frame of representative image in the video stream may be selected, so that the evaluation information of the image in the video stream can relatively accurately represent a feature of the video stream.

Alternatively, if information about an image in a video stream includes evaluation information of a plurality of frames of images, a manner is: processing the evaluation information of the plurality of frames of images included in the video stream, to finally obtain one piece of evaluation information, and using the evaluation information as the evaluation information of the image in the video stream. In this case, the evaluation information of the image in the video stream may include one piece of evaluation information, and the evaluation information corresponds to the plurality of frames of images. The evaluation information of the plurality of frames of images is processed. For example, a manner is: calculating an average value of the evaluation information of the plurality of frames of images, where the average value may be an arithmetic average value, or may be a weighted average value; and using the average value as the evaluation information of the image in the video stream. Certainly, in addition to the manner of calculating the average value, the evaluation information of the plurality of frames of images may alternatively be obtained in another manner. This is not specifically limited. Alternatively, if information about an image in a video stream includes evaluation information of a plurality of frames of images, another manner is: skipping processing the evaluation information of the plurality of frames of images, but directly including the evaluation information of the plurality of frames of images in the evaluation information of the image in the video stream. In this case, the evaluation information of the image in the video stream may include a plurality of pieces of evaluation information, and one piece of evaluation information corresponds to one frame of image. The evaluation information of the plurality of frames of images is used to reflect a feature of the video stream, so that the evaluation information of the video stream can represent the feature of the video stream more accurately.

With reference to the first aspect, in a possible implementation of the first aspect, the information about each video stream further includes information about the first event, and the information about the first event includes one or more of the following information: type information of the first event, an identifier of the first event, information about a position at which the first event occurs, and information about a time at which the first event occurs.

For example, the information about the first event includes the type information of the first event and the information about the position at which the first event occurs; or the information about the first event includes the type information of the first event, the information about the position at which the first event occurs, and the information about the time at which the first event occurs; or the information about the first event includes the type information of the first event, the identifier of the first event, the information about the position at which the first event occurs, and the information about the time at which the first event occurs. Information about one video stream may further include the information about the first event. The first event may be described in more detail based on the information about the first event. After obtaining the information about the video stream, the server can learn of the first event more clearly based on the information about the first event.

With reference to the first aspect, in a possible implementation of the first aspect, the method further includes: determining an evaluation score of each video stream based on the evaluation information of the video stream, where the evaluation score of each video stream is determined based on the evaluation information of the image in the video stream.

After obtaining the evaluation information of the first video stream and the evaluation information of the second video stream, the server may determine an evaluation score of the first video stream based on the evaluation information of the first video stream, or may determine an evaluation score of the second video stream based on the evaluation information of the second video stream. The evaluation score of the first video stream may be determined based on evaluation information of an image in the first video stream. For example, an evaluation score or sub-evaluation score of each of the at least one frame of image may be determined, and the evaluation score of the first video stream may be obtained by combining a sub-evaluation score of the at least one frame of image. The at least one frame of image may be all images included in the first video stream, or some images included in the first video stream. If the evaluation score of the first video stream is determined based on evaluation information of all the images included in the first video stream, it is equivalent that all the images included in the first video stream are considered when the evaluation score of the first video stream is calculated. In this way, the calculated evaluation score of the first video stream can be more accurate. Alternatively, if the evaluation score of the first video stream is determined based on evaluation information of some images included in the first video stream, it is equivalent that only some images included in the first video stream need to be considered when the evaluation score of the first video stream is calculated. In this way, a calculation workload can be reduced. In addition, some images are considered, which is equivalent that sampling is performed. Therefore, accuracy of the obtained evaluation score of the first video stream can also be ensured to some extent. The same effect can be achieved for the second video stream.

With reference to the first aspect, in a possible implementation of the first aspect, the information about each video stream further includes an identifier of an image collection unit that collects the video stream, and the method further includes: obtaining information about a position and field of view of each image collection unit based on an identifier of the image collection unit; and determining a matching degree between each video stream and the first vehicle based on at least one of driving route information of the first vehicle and lane information of the first vehicle and based on the information about the position and field of view of each image collection unit.

For example, a plurality of image collection units may be deployed on a road, and different image collection units may collect different video streams. The plurality of image collection units may be deployed at different positions on the road. For vehicles on the road, driving routes may be different, and lanes may also be different. In this case, when the first vehicle watches video streams collected by some image collection units, photographing angles corresponding to the video streams can meet a field of vision of the vehicle, so that the vehicle can learn of relatively complete content about the first event. However, when the first vehicle watches video streams collected by other image collection units, photographing angles corresponding to the video streams may deviate greatly from the field of vision of the vehicle. When watching these video streams, the vehicle cannot obtain relatively complete content about the first event. In this case, the matching degree between each video stream and the first vehicle may be further determined based on at least one of the driving route information of the first vehicle and the lane information of the first vehicle and based on the information about the position and field of view of each image collection unit. The matching degree herein may be understood as a matching degree between a video stream and the field of vision of the first vehicle, or may be understood as a matching degree between a photographing angle corresponding to a video stream and the field of vision of the first vehicle. If a matching degree between a video stream and the first vehicle is higher, a passenger in the first vehicle can obtain more content about the first event by watching the video stream. In this case, a matching degree between a video stream and the first vehicle may be used as a factor for selecting the video stream for the first vehicle.

With reference to the first aspect, in a possible implementation of the first aspect, the determining an evaluation score of each video stream based on the evaluation information of the first video stream and the evaluation information of the second video stream includes: determining an evaluation score of the first video stream based on the evaluation information of the first video stream and a matching degree between the first video stream and the first vehicle; and determining an evaluation score of the second video stream based on the evaluation information of the second video stream and a matching degree between the second video stream and the first vehicle.

Each of the at least one video stream may correspond to one evaluation score. One frame of image may also correspond to one evaluation score. For differentiation, an evaluation score corresponding to an image may be referred to as a sub-evaluation score. It may be considered that a sub-evaluation score corresponds to an image, and an evaluation score corresponds to a video stream. One frame of image corresponds to one sub-evaluation score, and one video stream may include one or more frames of images. Therefore, it may also be considered that one video stream corresponds to one or more sub-evaluation scores. An evaluation score corresponding to one video stream may be obtained based on a sub-evaluation score of an image included in the video stream. For example, an evaluation score of one video stream may be determined based on evaluation information of one frame of image included in the video stream. This may be understood as that the evaluation score of the video stream is obtained based on a sub-evaluation score of the image. Alternatively, an evaluation score of one video stream may be determined based on evaluation information of a plurality of frames of images included in the video stream. This may be understood as that the evaluation score of the video stream is obtained based on a plurality of sub-evaluation scores of the plurality of frames of images.

For example, the server may determine a sub-evaluation score of one frame of image based on integrity of the image, a deviation degree of the image, and a matching degree between the image and the first vehicle. Herein, a matching degree corresponding to the image is the matching degree between the image and the first vehicle. Therefore, the to-be-determined sub-evaluation score of the image herein is a sub-evaluation score of the image relative to the first vehicle. A larger ratio of an area of an event detection region in one frame of image to an area of a region of interest in the image indicates a higher sub-evaluation score of the image. In addition, to avoid a case in which the event detection region is located at a position that is greatly deviating from a main field of vision, for example, the event detection region may be located at an edge position of the image and is inconvenient for watching, a deviation degree of the image needs to be further subtracted. In other words, if the event detection region in the image is closer to a center of the region of interest, it indicates that the sub-evaluation score of the image is higher. Then, the matching degree between the image and the first vehicle is added. For example, when a sub-evaluation score of one frame of image relative to a vehicle is to be determined, a higher matching degree between the image and the vehicle indicates a higher sub-evaluation score of the image. In this manner of determining a sub-evaluation score of an image, an image with a higher sub-evaluation score is an image that can provide more valuable information for a passenger in a vehicle. In other words, the image with the higher sub-evaluation score is an image that can be selected for the vehicle.

With reference to the first aspect, in a possible implementation of the first aspect, the selecting the first video stream for a first vehicle based on evaluation information of the first video stream and evaluation information of the second video stream includes: selecting the first video stream for the first vehicle based on the evaluation score of the first video stream and the evaluation score of the second video stream.

After the evaluation score of the first video stream and the evaluation score of the second video stream are obtained, the video stream may be selected for the first vehicle based on the evaluation score of the first video stream and the evaluation score of the second video stream. For example, the first video stream is selected. A video stream can be selected for a vehicle based on an evaluation score of the video stream. This manner is relatively simple without a need to use a complex selection mechanism, and is more convenient to implement by the server.

With reference to the first aspect, in a possible implementation of the first aspect, the evaluation score of the first video stream is higher than the evaluation score of the second video stream.

For example, when a video stream is to be selected for the first vehicle based on an evaluation score of the video stream, a video stream with a highest evaluation score may be selected for the first vehicle. If the evaluation score of the first video stream is higher than the evaluation score of the second video stream, the first video stream can be selected for the first vehicle. For example, the evaluation score of the video stream may be obtained based on evaluation information of the video stream and a matching degree between the video stream and the first vehicle. The evaluation information of the video stream includes integrity of an image and a deviation degree of the image, and the matching degree between the video stream and the first vehicle includes a matching degree between a photographing angle corresponding to the video stream and a field of vision of the first vehicle. For example, if the integrity of the image is better, the evaluation score of the video stream may be higher; and if the integrity of the image is better, more valuable information can be obtained for a passenger in the first vehicle. For another example, if the deviation degree of the image indicates that an event detection region in the image is closer to a center of a region of interest, it indicates that the evaluation score of the corresponding video stream is higher; and if the event detection region is closer to the center of the region of interest, it indicates that a passenger in the first vehicle can obtain better watching experience when watching the video stream. For still another example, a higher matching degree between the video stream and the first vehicle indicates that the photographing angle corresponding to the video stream better matches the field of vision of the first vehicle. In other words, a passenger in the first vehicle can obtain more valuable information by watching the video stream. In other words, if the evaluation score of the video stream is higher, the passenger in the first vehicle can obtain better watching experience when watching the video stream. Therefore, a video stream with a higher evaluation score is selected for the first vehicle, to enable the passenger in the first vehicle to obtain better watching experience, and obtain more valuable information about the first event.

With reference to the first aspect, in a possible implementation of the first aspect, the first message further includes one or more of the following: the information about the position at which the first event occurs, the type information of the first event, the information about the time at which the first event occurs, and information about a road on which the first vehicle is located.

The server may send the first message to the first vehicle, and the first vehicle may request the video stream from a corresponding computing device based on the first message. In addition, the server may further send more information to the first vehicle, so that the first vehicle obtains more diversified information. For example, the server may send, to the first vehicle, the information about the position at which the first event occurs, so that the first vehicle can determine the position at which the first event occurs; or the server may send the information about the position at which the first event occurs and the type information of the first event to the first vehicle, so that the first vehicle can determine the position at which the first event occurs, and can also learn of a type of the first event; or the server may send, to the first vehicle, the information about the position at which the first event occurs and the information about the time at which the first event occurs, so that the first vehicle can determine the position at which the first event occurs, and can also learn of the time at which the first event occurs; or the server may send, to the first vehicle, the information about the position at which the first event occurs, the type information of the first event, the information about the time at which the first event occurs, and the information about the road on which the first vehicle is located, so that the first vehicle can determine the position at which the first event occurs and a type of the first event, and can also learn of the time at which the first event occurs and the road on which the first vehicle is located.

With reference to the first aspect, in a possible implementation of the first aspect, the obtaining information about a first video stream and information about a second video stream includes: obtaining the information about the first video stream from a first computing device and the information about the second video stream from a second computing device, where the address corresponding to the first video stream is an address that is provided by the first computing device and that is used to obtain the first video stream, and an address corresponding to the second video stream is an address that is provided by the second computing device and that is used to obtain the second video stream.

For example, the server may communicate with one or more computing devices, and each computing device may send information about one or more video streams to the server. The server may obtain information about at least one video stream in total. For example, the information about the first video stream and the information about the second video stream belong to the information about the at least one video stream. For example, the information about the first video stream and the information about the second video stream may come from one computing device, for example, both from the first computing device. Alternatively, the information about the first video stream and the information about the second video stream may come from different computing devices. For example, the information about the first video stream comes from the first computing device, and the information about the second video stream comes from the second computing device. This is not specifically limited. Information about a video stream may include an address corresponding to the video stream. An address corresponding to a video stream may be used to obtain the video stream. For example, after obtaining an address corresponding to a video stream, a vehicle can obtain the video stream from the address.

With reference to the first aspect, in a possible implementation of the first aspect, the first computing device and the second computing device are a same computing device.

For example, the information about the first video stream and the information about the second video stream may come from one computing device, for example, both from the first computing device. In other words, the first computing device and the second computing device are a same computing device. Alternatively, the information about the first video stream and the information about the second video stream may come from different computing devices. For example, the information about the first video stream comes from the first computing device, and the information about the second video stream comes from the second computing device. The first computing device and the second computing device are different computing devices. Certainly, this is not specifically limited.

According to a second aspect, a second communication method is provided. The method includes: communicating with one or more image collection units, and receiving a video stream collected by each image collection unit; determining a first video stream from the received video stream, and obtaining information about the first video stream, where the first video stream is a video stream related to a first event; and sending the information about the first video stream to a server, where the information about the first video stream includes evaluation information of the first video stream and an address corresponding to the first video stream.

The method in the second aspect may be performed by a second communications apparatus. The second communications apparatus may be a communications device or an apparatus, for example, a chip system, having a function that can support a communications device to implement the method. For example, the communications device is a computing device. For example, the computing device is an intelligent transportation edge, or may be another device. For example, in the following descriptions, the second communications apparatus is an intelligent transportation edge. The image collection unit is, for example, a camera, or may be another device that can be used to collect a video stream.

The intelligent transportation edge may communicate with one or more image collection units. The image collection units may be deployed on a roadside, and may collect video streams in real time. These video streams may reflect a condition on a road. The image collection units may send the collected video streams to the intelligent transportation edge, so that the intelligent transportation edge can receive the video streams from the image collection units. For example, the first video stream may be a video stream related to the first event. In this case, the intelligent transportation edge may obtain the information about the first video stream, and send the information about the first video stream to the server. In this way, the information about the first video stream can be used by the server to select a video stream for a vehicle. For a manner used by the server to select a video stream for a vehicle, refer to the description according to any one of the first aspect or the implementations of the first aspect. The intelligent transportation edge sends the information about the video stream to the server, so that the server can select a relatively appropriate video stream for the vehicle, and the vehicle does not need to autonomously select a video stream. This improves efficiency of obtaining a valuable video stream by the vehicle. In addition, the vehicle can obtain the relatively appropriate video stream, so that the vehicle can learn of a complete picture of the first event, and the vehicle can effectively avoid a pedestrian, another vehicle, or the like. This reduces a collision possibility, and improves driving safety.

With reference to the second aspect, in a possible implementation of the second aspect, the evaluation information of the first video stream includes evaluation information of an image in the first video stream, and the evaluation information of the image includes one or more of the following: integrity of the image, a deviation degree of the image, and resolution of the image. The integrity of the image is a ratio of an area of an event detection region to an area of an ROI region in the image, and the deviation degree of the image is a deviation degree of a geometric center of the event detection region in the image relative to a center position of the image.

With reference to the second aspect, in a possible implementation of the second aspect, the evaluation information of the image in the first video stream includes evaluation information of at least one frame of image in the first video stream.

With reference to the second aspect, in a possible implementation of the second aspect, the determining a first video stream from the received video stream, and obtaining information about the first video stream includes: analyzing the received video stream collected by each image collection unit, determining the first video stream related to the first event, and obtaining the information about the first video stream.

In this manner, an image collection unit has no analysis capability. After collecting the video streams, the image collection units directly send the video streams to the intelligent transportation edge, and the intelligent transportation edge analyzes the video streams to determine which video streams are related to the first event. The intelligent transportation edge may obtain information about video streams related to the first event, and send the information about these video streams to the server. The first video stream is, for example, one of these video streams. An image collection unit only needs to complete a basic function of collecting a video stream, and the intelligent transportation edge may complete an operation such as analyzing the video stream. This reduces a workload of the image collection unit. Therefore, implementation of the image collection unit is simpler.

With reference to the second aspect, in a possible implementation of the second aspect, the information about the first video stream further includes information about the first event, and the information about the first event includes one or more of the following: type information of the first event, an identifier of the first event, information about a position at which the first event occurs, and information about a time at which the first event occurs.

With reference to the second aspect, in a possible implementation of the second aspect, the determining a first video stream from the received video stream, and obtaining information about the first video stream includes: receiving an event detection message from a first image collection unit in the one or more image collection units, where the event detection message is used to indicate that the first image collection unit detects the first event in a video stream collected by the first image collection unit, and the event detection message includes information about the video stream collected by the first image collection unit; and determining that the video stream collected by the first image collection unit is the first video stream, and obtain the information about the first video stream.

In this manner, an image collection unit has a particular analysis capability. For example, after collecting a video stream, an image collection unit may analyze the video stream to determine whether the video stream is related to the first event. If the video stream is related to the first event, the image collection unit may send the video stream to the intelligent transportation edge. In this case, provided that the intelligent transportation edge receives the video stream from the image collection unit, the intelligent transportation edge can determine that the video stream is a video stream related to the first event, and no longer needs to analyze the video stream. The image collection unit may further obtain information about the video stream by analyzing the video stream related to the first event, and send the information about the video stream to the intelligent transportation edge by using an event detection message. In this case, the intelligent transportation edge may directly receive the video stream and the information about the video stream from the image collection unit, and the intelligent transportation edge no longer needs to further analyze the video stream. This can reduce a workload of the intelligent transportation edge, which is equivalent that the workload of the intelligent transportation edge is taken over by the image collection unit, and therefore can improve processing efficiency of the intelligent transportation edge.

With reference to the second aspect, in a possible implementation of the second aspect, the information about the first video stream further includes information about the first event, and the information about the first event includes one or more of the following: type information of the first event, an identifier of the first event, information about a position at which the first event occurs, and information about a time at which the first event occurs.

With reference to the second aspect, in a possible implementation of the second aspect, the address corresponding to the first video stream is an address from which the first video stream can be obtained.

Information about a video stream may include an address corresponding to the video stream. An address corresponding to a video stream may be used to obtain the video stream. For example, after obtaining an address corresponding to a video stream, a vehicle can obtain the video stream from the address.

With reference to the second aspect, in a possible implementation of the second aspect, the method further includes: receiving a video request message from a first vehicle, where the video request message includes the address corresponding to the first video stream; determining, based on the address, the first video stream and the first image collection unit corresponding to the first video stream; and sending, to the first vehicle, the video stream collected by the first image collection unit.

The server may send, to the first vehicle, the address corresponding to the first video stream selected for the first vehicle. After obtaining the address, the first vehicle may send the address to the intelligent transportation edge. After obtaining the address, the intelligent transportation edge may determine the first video stream, and may further determine the image collection unit corresponding to the first video stream, for example, the first image collection unit. For example, the address corresponding to the first video stream may include a port number of the intelligent transportation edge. In this case, the intelligent transportation edge may determine, based on the port number included in the address corresponding to the first video stream, that the first vehicle requests a video stream from a port corresponding to the port number. One port of the intelligent transportation edge may correspond to one image collection unit. In other words, the intelligent transportation edge may receive a video stream from one image collection unit through one port. In this case, after determining the port number, the intelligent transportation edge can determine the corresponding image collection unit, for example, the first image collection unit. Then, the intelligent transportation edge may continue to receive a video stream from the first image collection unit through the port corresponding to the port number, and send the received video stream to the first vehicle. Because the first image collection unit collects an image in real time, when a first computing device sends the video stream from the first image collection unit to the first vehicle, the sent video stream is no longer the first video stream, but a video stream collected by a first camera in real time, where the video stream is referred to as a third video stream.

For technical effects achieved in the second aspect or the possible implementations of the second aspect, refer to the descriptions of the technical effects achieved in the first aspect or the corresponding implementations of the first aspect.

According to a third aspect, a third communication method is provided. The method includes: collecting a first video stream; determining that the first video stream is a video stream related to a first event; and sending the first video stream to a first device.

The method in the third aspect may be performed by a third communications apparatus. The third communications apparatus may be a communications device or an apparatus, for example, a chip system, having a function that can support a communications device to implement the method. For example, the communications device is an image collection unit. For example, the image collection unit is a camera, or may be another device that can collect a video stream. For example, in the following description, the third communications apparatus is an image collection unit.

For example, the image collection unit has a specific analysis capability. For example, after collecting a video stream, an image collection unit may analyze the video stream to determine whether the video stream is related to the first event. If the video stream is related to the first event, the image collection unit may send the video stream to an intelligent transportation edge. Provided that the intelligent transportation edge receives the video stream from the image collection unit, the intelligent transportation edge can determine that the video stream is related to the first event, and no longer needs to analyze the video stream. This manner can reduce a workload of the intelligent transportation edge, which is equivalent that the workload of the intelligent transportation edge is taken over by the image collection unit, and therefore can improve processing efficiency of the intelligent transportation edge.

With reference to the third aspect, in a possible implementation of the third aspect, the method further includes: analyzing the first video stream to obtain information about the first video stream; and sending the information about the first video stream to the computing device, where the information about the first video stream includes evaluation information of the first video stream.

After collecting a video stream, an image collection unit may analyze the video stream to determine whether the video stream is related to the first event. If the video stream is related to the first event, the image collection unit may further analyze the video stream to obtain information about the video stream, and send the information about the video stream to the intelligent transportation edge by using an event detection message. In this case, the intelligent transportation edge may directly receive the video stream and the information about the video stream from the image collection unit, and the intelligent transportation edge no longer needs to further analyze the video stream. This can reduce a workload of the intelligent transportation edge, which is equivalent that the workload of the intelligent transportation edge is taken over by the image collection unit, and therefore can improve processing efficiency of the intelligent transportation edge.

With reference to the third aspect, in a possible implementation of the third aspect, the evaluation information of the first video stream includes evaluation information of an image in the first video stream, and the evaluation information of the image includes one or more of the following: integrity of the image, a deviation degree of the image, and resolution of the image. The integrity of the image is a ratio of an area of an event detection region to an area of an ROI region in the image, and the deviation degree of the image is a deviation degree of a geometric center of the event detection region in the image relative to a center position of the image.

With reference to the third aspect, in a possible implementation of the third aspect, the evaluation information of the image in the first video stream includes evaluation information of at least one frame of image in the first video stream.

With reference to the third aspect, in a possible implementation of the third aspect, the information about the first video stream further includes information about the first event, and the information about the first event includes one or more of the following: type information of the first event, an identifier of the first event, information about a position at which the first event occurs, and information about a time at which the first event occurs.

For technical effects achieved in the third aspect or the possible implementations of the third aspect, refer to the descriptions of the technical effects achieved in the first aspect or the corresponding implementations of the first aspect, or refer to the descriptions of the technical effects achieved in the second aspect or the corresponding implementations of the second aspect.

According to a fourth aspect, a first communications apparatus is provided. For example, the first communications apparatus is a same apparatus as the first communications apparatus according to any one of the first aspect or the possible implementations of the first aspect. The first communications apparatus is configured to perform the method according to any one of the first aspect or the possible implementations of the first aspect. Specifically, the first communications apparatus may include modules configured to perform the method according to any one of the first aspect or the possible implementations of the first aspect. For example, the first communications apparatus includes a processing module and a transceiver module. The transceiver module may be a functional module. The functional module can complete both a function of receiving information and a function of sending information. Alternatively, the transceiver module may be a general term of a sending module and a receiving module. The sending module is configured to complete a function of sending information, and the receiving module is configured to complete a function of receiving information. For example, the first communications apparatus is a server. For example, the server is a V2X server.

The processing module is configured to obtain information about a first video stream and information about a second video stream, where information about each video stream includes evaluation information of the video stream and an address corresponding to the video stream, and the first video stream and the second video stream are video streams related to a first event.

The processing module is further configured to select the first video stream for a first vehicle based on evaluation information of the first video stream and evaluation information of the second video stream.

The transceiver module is configured to send a first message to the first vehicle, where the first message includes an address corresponding to the first video stream.

With reference to the fourth aspect, in a possible implementation of the fourth aspect, the evaluation information of each video stream includes evaluation information of an image in the video stream, and the evaluation information of the image includes one or more of the following: integrity of the image, where the integrity of the image is a ratio of an area of an event detection region to an area of an ROI region in the image; a deviation degree of the image, where the deviation degree of the image is a deviation degree of a geometric center of the event detection region in the image relative to a center position of the image; and resolution of the image.

With reference to the fourth aspect, in a possible implementation of the fourth aspect, the evaluation information of the image in the video stream includes evaluation information of at least one frame of image in the video stream.

With reference to the fourth aspect, in a possible implementation of the fourth aspect, the information about each video stream further includes information about the first event, and the information about the first event includes one or more of the following information: type information of the first event, an identifier of the first event, information about a position at which the first event occurs, and information about a time at which the first event occurs.

With reference to the fourth aspect, in a possible implementation of the fourth aspect, the processing module is further configured to determine an evaluation score of each video stream based on the evaluation information of the video stream, where the evaluation score of each video stream is determined based on the evaluation information of the image in the video stream.

With reference to the fourth aspect, in a possible implementation of the fourth aspect, the information about each video stream further includes an identifier of an image collection unit that collects the video stream, and the processing module is further configured to: obtain information about a position and field of view of each image collection unit based on an identifier of the image collection unit; and determine a matching degree between each video stream and the first vehicle based on at least one of driving route information of the first vehicle and lane information of the first vehicle and based on the information about the position and field of view of each image collection unit.

With reference to the fourth aspect, in a possible implementation of the fourth aspect, the processing module is configured to determine the evaluation score of each video stream based on the evaluation information of the first video stream and the evaluation information of the second video stream in the following manner: determining an evaluation score of the first video stream based on the evaluation information of the first video stream and a matching degree between the first video stream and the first vehicle; and determining an evaluation score of the second video stream based on the evaluation information of the second video stream and a matching degree between the second video stream and the first vehicle.

With reference to the fourth aspect, in a possible implementation of the fourth aspect, the processing module is configured to select the first video stream for the first vehicle based on the evaluation information of the first video stream and the evaluation information of the second video stream in the following manner: selecting the first video stream for the first vehicle based on the evaluation score of the first video stream and the evaluation score of the second video stream.

With reference to the fourth aspect, in a possible implementation of the fourth aspect, the evaluation score of the first video stream is higher than the evaluation score of the second video stream.

With reference to the fourth aspect, in a possible implementation of the fourth aspect, the first message further includes one or more of the following: the information about the position at which the first event occurs, the type information of the first event, the information about the time at which the first event occurs, and information about a road on which the first vehicle is located.

With reference to the fourth aspect, in a possible implementation of the fourth aspect, the processing module is configured to obtain the information about the first video stream and the information about the second video stream in the following manner, including: obtaining, through the transceiver module, the information about the first video stream from a first computing device and the information about the second video stream from a second computing device, where the address corresponding to the first video stream is an address that is provided by the first computing device and that is used to obtain the first video stream, and an address corresponding to the second video stream is an address that is provided by the second computing device and that is used to obtain the second video stream.

With reference to the fourth aspect, in a possible implementation of the fourth aspect, the first computing device and the second computing device are a same computing device.

For technical effects achieved in the fourth aspect or the possible implementations of the fourth aspect, refer to the descriptions of the technical effects achieved in the first aspect or the corresponding implementations of the first aspect.

According to a fifth aspect, a second communications apparatus is provided. For example, the second communications apparatus is a same apparatus as the second communications apparatus according to any one of the second aspect or the possible implementations of the second aspect. The second communications apparatus is configured to perform the method according to any one of the second aspect or the possible implementations of the second aspect. Specifically, the second communications apparatus may include modules configured to perform the method according to any one of the second aspect or the possible implementations of the second aspect. For example, the second communications apparatus includes a processing module and a transceiver module. The transceiver module may be a functional module. The functional module can complete both a function of receiving information and a function of sending information. Alternatively, the transceiver module may be a general term of a sending module and a receiving module. The sending module is configured to complete a function of sending information, and the receiving module is configured to complete a function of receiving information. For example, the second communications apparatus is a computing device. For example, the computing device is an intelligent transportation edge.

The transceiver module is configured to communicate with one or more image collection units, and receive a video stream collected by each image collection unit.

The processing module is configured to determine a first video stream from the received video stream, and obtain information about the first video stream, where the first video stream is a video stream related to a first event.

The transceiver module is further configured to send the information about the first video stream to a server, where the information about the first video stream includes evaluation information of the first video stream and an address corresponding to the first video stream.

With reference to the fifth aspect, in a possible implementation of the fifth aspect, the evaluation information of the first video stream includes evaluation information of an image in the first video stream, and the evaluation information of the image includes one or more of the following:

integrity of the image, where the integrity of the image is a ratio of an area of an event detection region to an area of an ROI region in the image; a deviation degree of the image, where the deviation degree of the image is a deviation degree of a geometric center of the event detection region in the image relative to a center position of the image; and resolution of the image.

With reference to the fifth aspect, in a possible implementation of the fifth aspect, the evaluation information of the image in the first video stream includes evaluation information of at least one frame of image in the first video stream.

With reference to the fifth aspect, in a possible implementation of the fifth aspect, the processing module is configured to determine the first video stream from the received video stream and obtain the information about the first video stream in the following manner: analyzing the received video stream collected by each image collection unit, determining the first video stream related to the first event, and obtaining the information about the first video stream.

With reference to the fifth aspect, in a possible implementation of the fifth aspect, the information about the first video stream further includes information about the first event, and the information about the first event includes one or more of the following: type information of the first event, an identifier of the first event, information about a position at which the first event occurs, and information about a time at which the first event occurs.

With reference to the fifth aspect, in a possible implementation of the fifth aspect, the processing module is configured to determine the first video stream from the received video stream and obtain the information about the first video stream in the following manner: receiving, through the transceiver module, an event detection message from a first image collection unit in the one or more image collection units, where the event detection message is used to indicate that the first image collection unit detects the first event in a video stream collected by the first image collection unit, and the event detection message includes information about the video stream collected by the first image collection unit; and determining that the video stream collected by the first image collection unit is the first video stream, and obtaining the information about the first video stream.

With reference to the fifth aspect, in a possible implementation of the fifth aspect, the information about the first video stream further includes information about the first event, and the information about the first event includes one or more of the following: type information of the first event, an identifier of the first event, information about a position at which the first event occurs, and information about a time at which the first event occurs.

With reference to the fifth aspect, in a possible implementation of the fifth aspect, the address corresponding to the first video stream is an address from which the first video stream can be obtained.

With reference to the fifth aspect, in a possible implementation of the fifth aspect, the transceiver module is further configured to receive a video request message from a first vehicle, where the video request message includes the address corresponding to the first video stream; the processing module is further configured to determine, based on the address, the first video stream and the first image collection unit corresponding to the first video stream; and the transceiver module is further configured to send, to the first vehicle, the video stream collected by the first image collection unit.

For technical effects achieved in the fifth aspect or the possible implementations of the fifth aspect, refer to the descriptions of the technical effects achieved in the second aspect or the corresponding implementations of the second aspect.

According to a sixth aspect, a third communications apparatus is provided. For example, the third communications apparatus is a same apparatus as the third communications apparatus according to any one of the third aspect or the possible implementations of the third aspect. The third communications apparatus is configured to perform the method according to any one of the third aspect or the possible implementations of the third aspect. Specifically, the third communications apparatus may include modules configured to perform the method according to any one of the third aspect or the possible implementations of the third aspect. For example, the third communications apparatus includes a processing module and a transceiver module. The transceiver module may be a functional module. The functional module can complete both a function of receiving information and a function of sending information. Alternatively, the transceiver module may be a general term of a sending module and a receiving module. The sending module is configured to complete a function of sending information, and the receiving module is configured to complete a function of receiving information. For example, the third communications apparatus is an image collection unit. For example, the image collection unit is a camera.

The processing module is configured to collect a first video stream.

The processing module is further configured to determine that the first video stream is a video stream related to a first event.

The transceiver module is configured to send the first video stream to a computing device.

With reference to the sixth aspect, in a possible implementation of the sixth aspect, the processing module is further configured to analyze the first video stream to obtain information about the first video stream; and the transceiver module is further configured to send the information about the first video stream to the computing device, where the information about the first video stream includes evaluation information of the first video stream.

With reference to the sixth aspect, in a possible implementation of the sixth aspect, the evaluation information of the first video stream includes evaluation information of an image in the first video stream, and the evaluation information of the image includes one or more of the following: integrity of the image, where the integrity of the image is a ratio of an area of an event detection region to an area of an ROI region in the image; a deviation degree of the image, where the deviation degree of the image is a deviation degree of a geometric center of an event detection region in the image relative to a center position of the image; and resolution of the image.

With reference to the sixth aspect, in a possible implementation of the sixth aspect, the evaluation information of the image in the first video stream includes evaluation information of at least one frame of image in the first video stream.

With reference to the sixth aspect, in a possible implementation of the sixth aspect, the information about the first video stream further includes information about the first event, and the information about the first event includes one or more of the following: type information of the first event, an identifier of the first event, information about a position at which the first event occurs, and information about a time at which the first event occurs.

For technical effects achieved in the sixth aspect or the possible implementations of the sixth aspect, refer to the descriptions of the technical effects achieved in the third aspect or the corresponding implementations of the third aspect.

According to a seventh aspect, a first communications apparatus is provided. For example, the first communications apparatus is a same apparatus as the first communications apparatus according to any one of the first aspect or the possible implementations of the first aspect. The first communications apparatus includes a processor and a transceiver. The processor and the transceiver are coupled, to implement the method according to any one of the first aspect or the possible designs of the first aspect. For example, the first communications apparatus is a communications device. The transceiver is implemented by, for example, an antenna, a feeder, and a codec in the communications device. The transceiver may be a functional module. The functional module can complete both a function of receiving information and a function of sending information. Alternatively, the transceiver may be a general term of a sender and a receiver. The sender is configured to complete a function of sending information, and the receiver is configured to complete a function of receiving information. For example, the communications device is a server. For example, the server is a V2X server.

According to an eighth aspect, a second communications apparatus is provided. For example, the second communications apparatus is a same apparatus as the second communications apparatus according to any one of the second aspect or the possible implementations of the second aspect. The second communications apparatus includes a processor and a transceiver. The processor and the transceiver are coupled, to implement the method according to any one of the second aspect or the possible designs of the second aspect. For example, the second communications apparatus is a communications device. The transceiver is implemented by, for example, an antenna, a feeder, and a codec in the communications device. The transceiver may be a functional module. The functional module can complete both a function of receiving information and a function of sending information. Alternatively, the transceiver may be a general term of a sender and a receiver. The sender is configured to complete a function of sending information, and the receiver is configured to complete a function of receiving information. For example, the communications device is a computing device. For example, the computing device is an intelligent transportation edge.

According to a ninth aspect, a third communications apparatus is provided. For example, the third communications apparatus is a same apparatus as the third communications apparatus according to any one of the third aspect or the possible implementations of the third aspect. The third communications apparatus includes a processor and a transceiver. The processor and the transceiver are coupled, to implement the method according to any one of the third aspect or the possible designs of the third aspect. For example, the third communications apparatus is a communications device. The transceiver is implemented by, for example, an antenna, a feeder, and a codec in the communications device. The transceiver may be a functional module. The functional module can complete both a function of receiving information and a function of sending information. Alternatively, the transceiver may be a general term of a sender and a receiver. The sender is configured to complete a function of sending information, and the receiver is configured to complete a function of receiving information. For example, the communications device is an image collection unit. For example, the image collection unit is a camera.

According to a tenth aspect, a first communications apparatus is provided. For example, the first communications apparatus is a same apparatus as the first communications apparatus according to any one of the first aspect or the possible implementations of the first aspect. The first communications apparatus may include: a communications interface configured to communicate with another apparatus or device; and a processor, where the processor is coupled to the communications interface. For example, the first communications apparatus is a chip or chip system disposed in a communications device. The communications interface may be an input/output interface on the chip, for example, an input/output pin. For example, the communications device is a server. For example, the server is a V2X server.

With reference to the tenth aspect, in a possible implementation of the tenth aspect, the first communications apparatus may further include a memory configured to store computer-executable program code. The program code stored in the memory includes an instruction. When the processor executes the instruction, the first communications apparatus is enabled to perform the method according to any one of the first aspect or the possible implementations of the first aspect. Alternatively, the first communications apparatus may not include the memory. For example, the processor may execute an instruction stored in an external memory, to enable the first communications apparatus to perform the method according to any one of the first aspect or the possible implementations of the first aspect.

According to an eleventh aspect, a second communications apparatus is provided. For example, the second communications apparatus is a same apparatus as the second communications apparatus according to any one of the second aspect or the possible implementations of the second aspect. The second communications apparatus may include: a communications interface configured to communicate with another apparatus or device; and a processor, where the processor is coupled to the communications interface. For example, the second communications apparatus is a chip or chip system disposed in a communications device. The communications interface may be an input/output interface on the chip, for example, an input/output pin. For example, the communications device is a computing device. For example, the computing device is an intelligent transportation edge.

With reference to the eleventh aspect, in a possible implementation of the eleventh aspect, the second communications apparatus may further include a memory configured to store computer-executable program code. The program code stored in the memory includes an instruction. When the processor executes the instruction, the second communications apparatus is enabled to perform the method according to any one of the second aspect or the possible implementations of the second aspect. Alternatively, the second communications apparatus may not include the memory. For example, the processor may execute an instruction stored in an external memory, to enable the second communications apparatus to perform the method according to any one of the second aspect or the possible implementations of the second aspect.

According to a twelfth aspect, a third communications apparatus is provided. For example, the third communications apparatus is a same apparatus as the third communications apparatus according to any one of the third aspect or the possible implementations of the third aspect. The third communications apparatus may include: a communications interface configured to communicate with another apparatus or device; and a processor, where the processor is coupled to the communications interface. For example, the third communications apparatus is a chip or chip system disposed in a communications device. The communications interface may be an input/output interface on the chip, for example, an input/output pin. For example, the communications device is an image collection unit. For example, the image collection unit is a camera.

With reference to the twelfth aspect, in a possible implementation of the twelfth aspect, the third communications apparatus may further include a memory configured to store computer-executable program code. The program code stored in the memory includes an instruction. When the processor executes the instruction, the third communications apparatus is enabled to perform the method according to any one of the third aspect or the possible implementations of the third aspect. Alternatively, the third communications apparatus may not include the memory. For example, the processor may execute an instruction stored in an external memory, to enable the third communications apparatus to perform the method according to any one of the third aspect or the possible implementations of the third aspect.

According to a thirteenth aspect, a communications system is provided. The communications system includes the first communications apparatus according to the fourth aspect, the first communications apparatus according to the seventh aspect, or the first communications apparatus according to the tenth aspect.

With reference to the thirteenth aspect, in a possible implementation of the thirteenth aspect, the communications system further includes the second communications apparatus according to the fifth aspect, the second communications apparatus according to the eighth aspect, or the second communications apparatus according to the eleventh aspect.

With reference to the thirteenth aspect, in a possible implementation of the thirteenth aspect, the communications system further includes the third communications apparatus according to the sixth aspect, the third communications apparatus according to the ninth aspect, or the third communications apparatus according to the twelfth aspect.

According to a fourteenth aspect, a computer-readable storage medium is provided.

The computer-readable storage medium is configured to store a computer program. When the computer program is run on a computer, the computer is enabled to perform the method according to any one of the first aspect or the possible implementations of the first aspect.

According to a fifteenth aspect, a computer-readable storage medium is provided. The computer-readable storage medium is configured to store a computer program. When the computer program is run on a computer, the computer is enabled to perform the method according to any one of the second aspect or the possible implementations of the second aspect.

According to a sixteenth aspect, a computer-readable storage medium is provided. The computer-readable storage medium is configured to store a computer program. When the computer program is run on a computer, the computer is enabled to perform the method according to any one of the third aspect or the possible implementations of the third aspect.

According to a seventeenth aspect, a computer program product including an instruction is provided. The computer program product is used to store a computer program. When the computer program is run on a computer, the computer is enabled to perform the method according to any one of the first aspect or the possible implementations of the first aspect.

According to an eighteenth aspect, a computer program product including an instruction is provided. The computer program product is used to store a computer program. When the computer program is run on a computer, the computer is enabled to perform the method according to any one of the second aspect or the possible implementations of the second aspect.

According to a nineteenth aspect, a computer program product including an instruction is provided. The computer program product is used to store a computer program. When the computer program is run on a computer, the computer is enabled to perform the method according to any one of the third aspect or the possible implementations of the third aspect.

In the embodiments, an appropriate video stream can be matched for the vehicle, and the vehicle does not need to autonomously select a video stream. This improves efficiency of obtaining a valuable video stream by the vehicle. In addition, the first vehicle can learn of a complete picture of the first event, and therefore the first vehicle can effectively avoid a pedestrian, another vehicle, or the like. This reduces a collision possibility, and improves driving safety.

and

Figure 11:
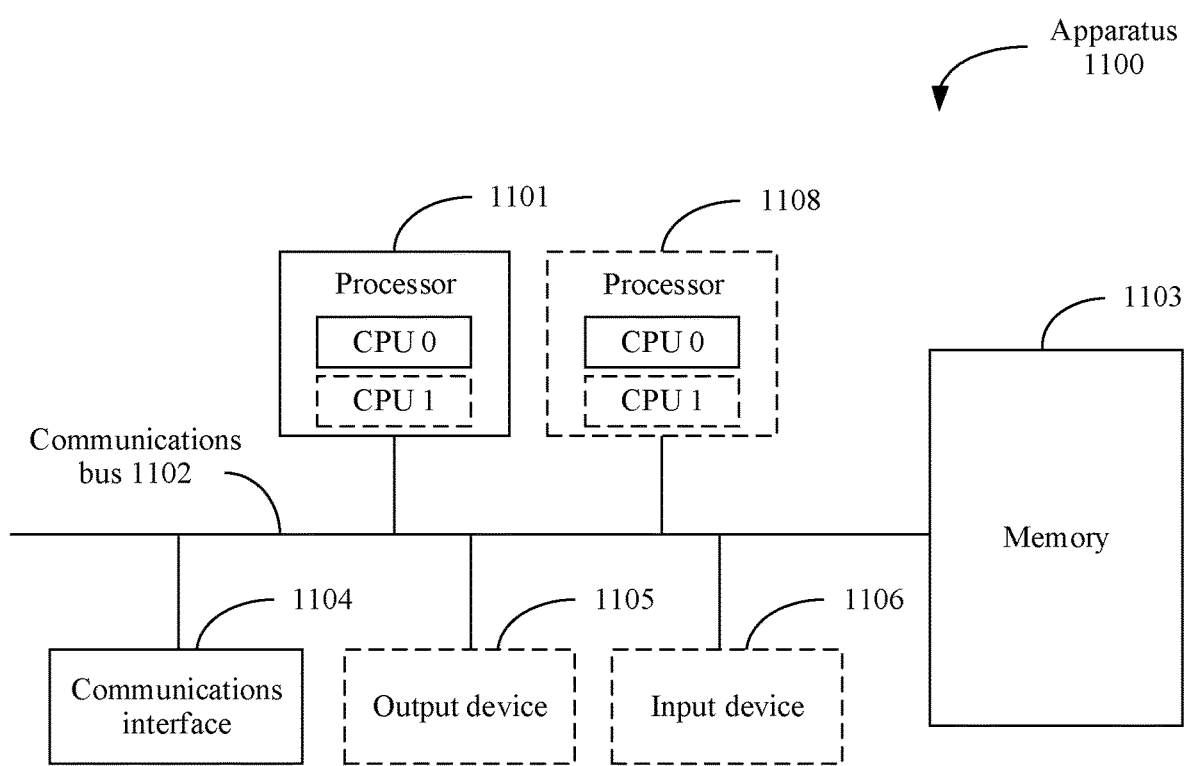

FIG. 11 is a schematic block diagram of an apparatus according to an embodiment.

DETAILED DESCRIPTION

To make the objectives, technical solutions, and advantages of the embodiments clearer, the following describes the embodiments in detail with reference to the accompanying drawings.

First, some concepts in the embodiments are described.

(1) Computing device: A computing device refers to a device that has a computing or analysis capability. The computing device may communicate with a terminal apparatus such as a sensor or a camera in a road or transport system, and the computing device may obtain data from the terminal apparatus, for example, data from the sensor or a video stream from the camera. The computing device may further communicate with another device. For example, the computing device may further communicate with a device such as a server.

The computing device may be deployed on, for example, an RSU, and is used as a component of the RSU. Alternatively, the computing device may be a device independently deployed. When the computing device is independently deployed, the computing device may communicate with another device or apparatus through forwarding by an RSU. For example, the computing device communicates with the terminal apparatus in the road or transport system through an RSU, or communicates with a server through an RSU. The RSU may be a fixed infrastructure entity that supports a V2X application, and may exchange a message with another apparatus that supports the V2X application. The RSU may be deployed on a roadside, or may be deployed at another place.

The computing device may be specifically an intelligent transportation edge (ITE) or an intelligent transportation unit. The computing device may also be referred to as another name such as an edge node or an edge computing node. A specific form or a name of the device does not constitute any limitation on the computing device.

(2) In-vehicle apparatus: An in-vehicle apparatus includes, for example, an on-board unit (OBU), and is generally installed on a vehicle. Another terminal apparatus on the vehicle may also be considered as an in-vehicle apparatus, for example, user equipment (UE). Alternatively, the in-vehicle apparatus may be a wearable device, for example, a device worn by a person in the vehicle. The wearable device may also be referred to as a wearable intelligent device, an intelligent wearable device, or the like, and is a general term of wearable devices that are intelligently developed and designed for daily wear by using a wearable technology, for example, glasses, gloves, watches, clothes, and shoes. The wearable device is a portable device that is directly worn on a body or integrated into clothes or an accessory of a user. The wearable device is not only a hardware device, but also implements a powerful function through software support, data exchange, and cloud interaction. In a broad sense, the wearable intelligent device includes a full-featured and large-sized device, for example, a smart watch or smart glasses, that can implement complete or partial functions without depending on a smartphone, and includes a device, for example, various smart bands, smart helmets, or smart jewelry for monitoring physical signs, that focuses on only one type of application function and needs to collaboratively work with another device such as a smartphone.

(3) The terms "system" and "network" may be interchangeably used. "At least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be in a singular or plural form. The character "/" generally indicates an "or" relationship between associated objects. "At least one (item or frame) of the following" or a similar expression thereof refers to any combination of these items, including any combination of (item or frame) in a singular or plural form. For example, at least one (item or frame) of a, b, or c may represent: a, b, c, a-b, a-c, b-c, or a-b-c, where a, b, and c may be singular or plural.

In addition, unless otherwise stated, ordinal numbers such as "first" and "second" are used to distinguish between a plurality of objects, but are not intended to limit a sequence, a time sequence, priorities, or importance of the plurality of objects. For example, a first video stream and a second video stream are merely used to distinguish between different video streams, but do not indicate that the two types of video streams have different priorities, importance, or the like.

The foregoing describes some concepts in the embodiments. The following describes a specific method and procedure in the embodiments.

A see-through function is a function that a vehicle that is traveling on a road obtains a video stream photographed by a camera deployed on a roadside. Currently, a user in a vehicle may obtain, through a manual operation, a video stream photographed by a camera on a roadside. For example, a display is disposed in a cab of the vehicle. The display may display a map, and a plurality of cameras may be shown on the map. If the user wants to obtain a video stream photographed by a camera, the user may tap an icon of the corresponding camera on the map, so that the vehicle can receive a video photographed by the camera.

Figure 1A:
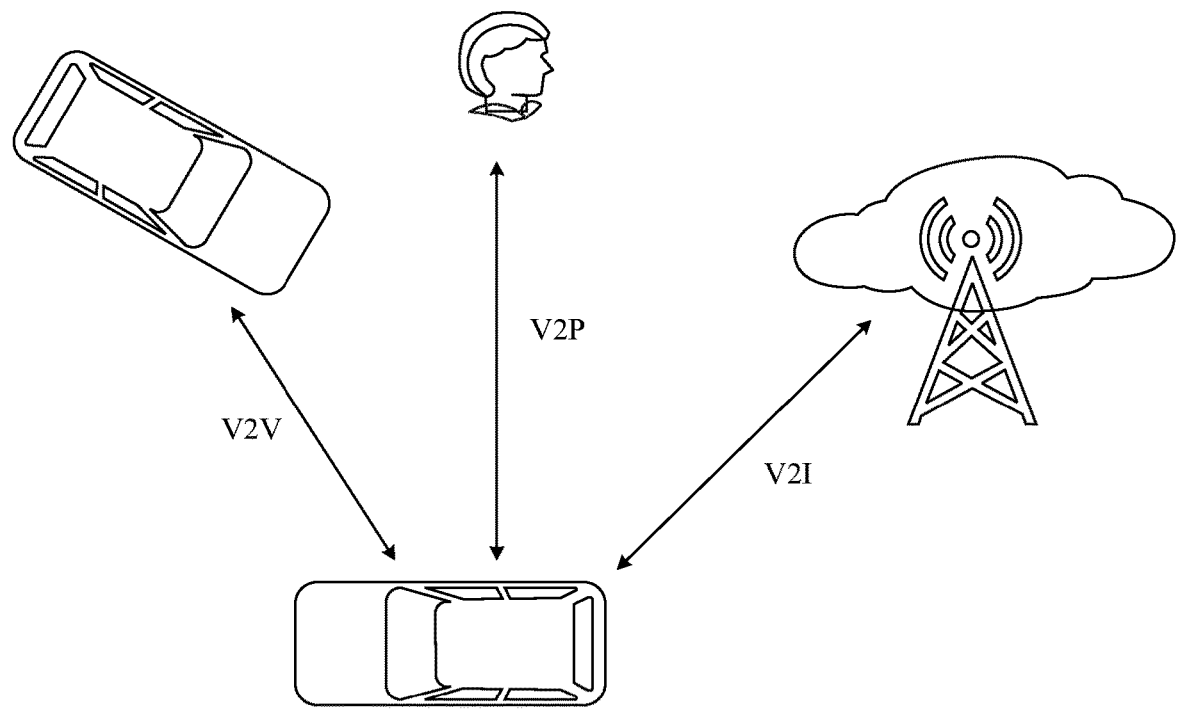
FIG. 1A is a schematic diagram of several V2X scenarios.
Figure 1B:
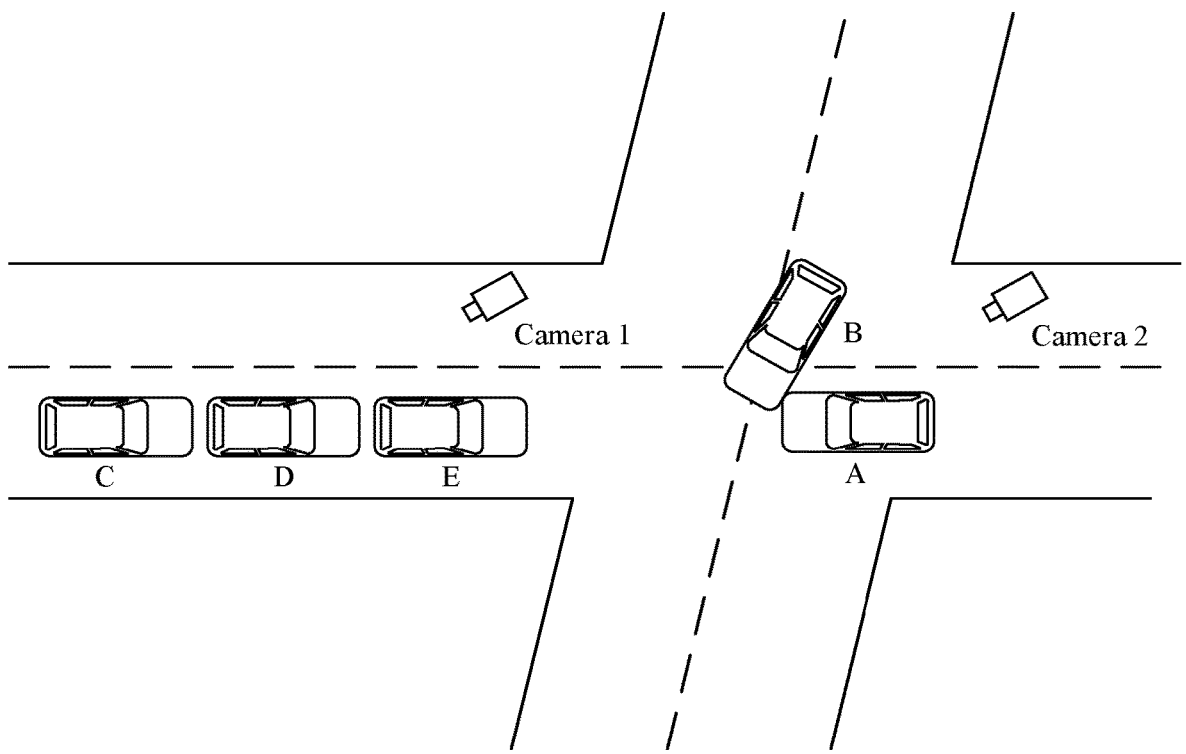
FIG. 1B is a schematic diagram of an accident occurring on a road.

When an accident occurs on a road, the user may want to see detailed information about the accident. In this case, the user may learn of the detailed information about the accident by obtaining a video stream photographed by a camera. For example, FIG. 1B is a schematic diagram of an accident scenario. In FIG. 1B, a traffic accident occurs on a road, a vehicle A collides with a vehicle B, and other vehicles are congested. For example, a vehicle C, a vehicle D, and a vehicle E are all in a congestion state. However, a line of sight of a congested rear vehicle is blocked by a front vehicle and cannot learn of a condition of the accident. For example, a line of sight of the vehicle C is blocked by the vehicle D and the vehicle E, a line of sight of the vehicle D is blocked by the vehicle E, and neither the vehicle C nor the vehicle D can learn of the condition of the accident in front. In this case, a user in a rear vehicle may obtain, through a manual operation, a video stream photographed by a camera on a roadside, to see the condition of the accident. For example, a plurality of cameras may be deployed on the roadside. In FIG. 1B, for example, a camera 1 and a camera 2 are deployed. The cameras are deployed at different positions, and different cameras may photograph different pictures about the accident. For example, some cameras photograph pictures showing a relatively complete condition of the accident, and some cameras may photograph pictures showing only a part of the condition of the accident. The user does not know a specific position at which the accident occurs, and therefore does not know which camera photographs a picture that is worthy of a reference. In this case, the user can only sequentially obtain video streams photographed by all cameras, and know which video stream is worthy of a reference only after watching the video streams. Definitely, this requires a plurality of operations. Consequently, efficiency of obtaining a valuable video stream is relatively low. In addition, if the accident occurs suddenly, the vehicle may not be able to sequentially obtain the video streams photographed by all the cameras, and may even collide with another object. Consequently, safety is relatively poor.

In view of this, the technical solutions in the embodiments are provided. In the embodiments, a first video stream may be selected for a first vehicle based on evaluation information of the first video stream and evaluation information of a second video stream. The first video stream may be a video stream selected after the evaluation information of the first video stream and the evaluation information of the second video stream are analyzed. For example, the first video stream is a video stream that is more appropriate for the first vehicle. "Appropriate" means that the first video stream may be a video stream with a highest score in a plurality of video streams after the plurality of video streams are evaluated by using a specific algorithm. In other words, by watching the first video stream, a passenger in the first vehicle can see relatively complete content about a first event. In this way, an appropriate video stream can be matched for the vehicle, and the vehicle does not need to autonomously select a video stream. In comparison with a manual operation, a process in which a server selects the video stream is less time-consuming, a video stream can be provided for the vehicle in time even if an accident occurs suddenly, and efficiency of obtaining a valuable video stream by the vehicle is improved. In addition, the first vehicle can learn of a complete picture of the first event, and therefore the first vehicle can effectively avoid a pedestrian, another vehicle, or the like. This reduces a collision possibility, and improves driving safety.

Figure 2A:
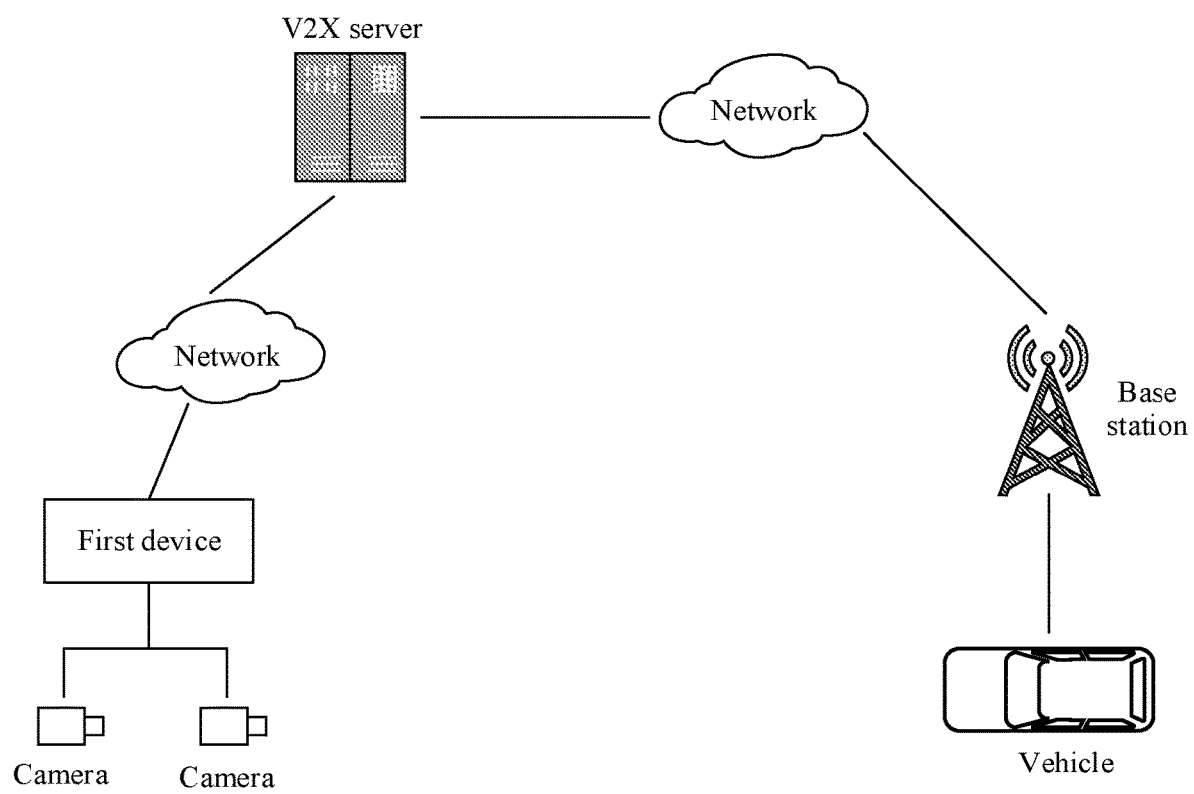
FIG. 2A is a schematic diagram of a system architecture used in an embodiment.

FIG. 2A shows a system architecture used in an embodiment.

In FIG. 2A, the system architecture includes a camera, a computing device, a base station, a V2X server, and a vehicle. In FIG. 2A, that there are two cameras is used as an example. Actually, there may be only one camera that communicates with one computing device.

Figure 2B:
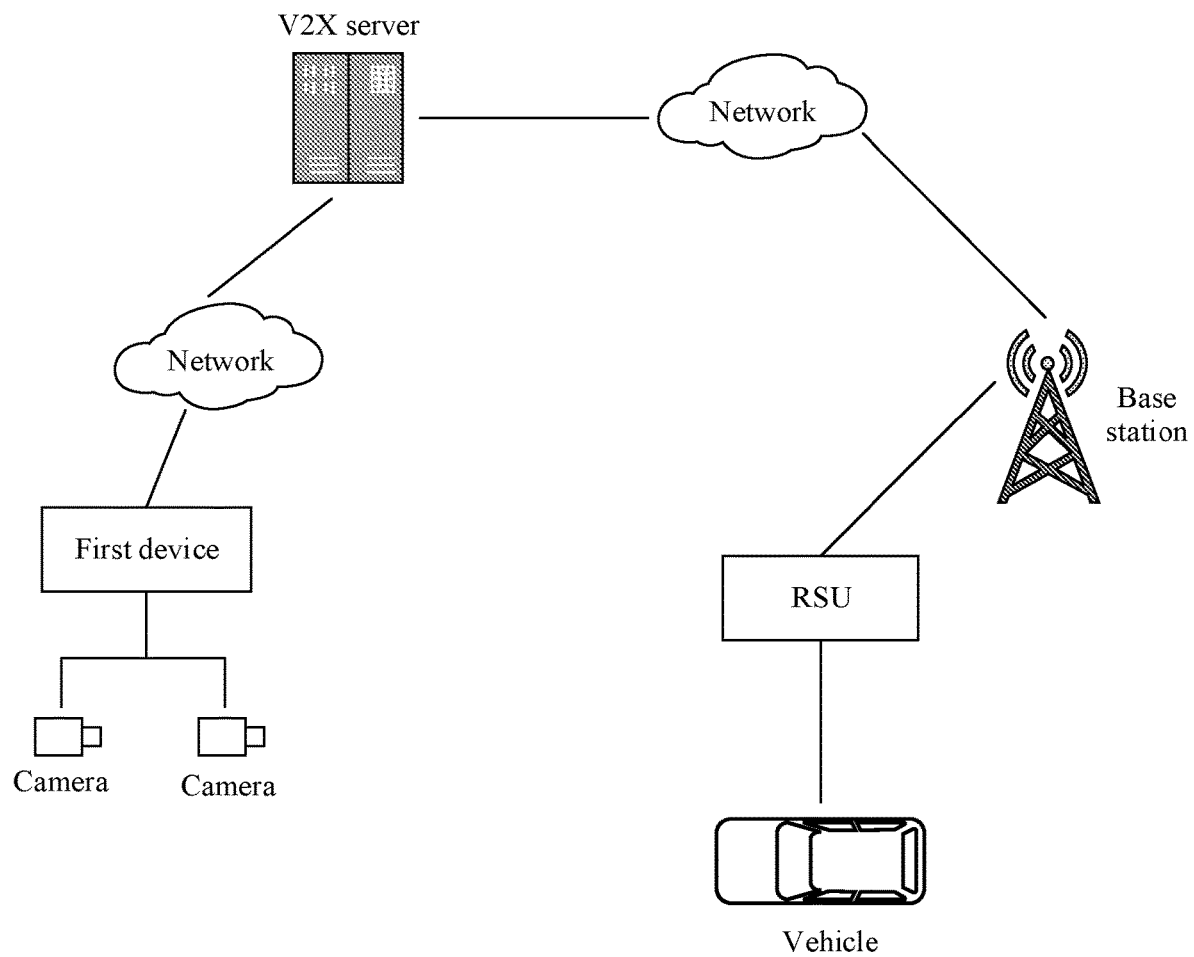
FIG. 2B is a schematic diagram of another system architecture used in an embodiment.

Alternatively, there may be a plurality of cameras that communicate with one computing device. In addition, in FIG. 2A, that there is only one vehicle is used as an example. Actually, there may be a plurality of vehicles. The vehicle may directly communicate with the base station, as shown in FIG. 2A. Alternatively, FIG. 2B shows another system architecture used in an embodiment. A difference between the system architecture shown in FIG. 2B and the system architecture shown in FIG. 2A lies in that in the system architecture shown in FIG. 2B, a vehicle may communicate with a base station through an RSU. A network shown in FIG. 2A or FIG. 2B is, for example, an Internet Protocol (IP) network.

The camera may communicate with the computing device. The computing device may communicate with the internet. The camera may collect a video stream, and may send the collected video stream to the computing device. The computing device may send, to the vehicle through the V2X server and the base station, the video stream collected by the camera. Alternatively, the computing device may send, to the vehicle through the V2X server, the base station, and the RSU, the video stream collected by the camera. Through collaboration between the devices, the video stream collected by the camera can be pushed to the vehicle, so that a passenger in the vehicle can see a corresponding condition on a road.

Only one computing device may be deployed on one road. For example, the computing device may be deployed at a position such as a roadside or an intersection. Alternatively, a plurality of computing devices may be deployed on one road, and functions implemented by all the computing devices may be similar. Therefore, one of the computing devices is used as an example for description in this specification. In both FIG. 2A and FIG. 2B, that there is only one computing device is used as an example. In addition, one or more cameras may be deployed on one road. One camera may communicate with one computing device. If a plurality of cameras and one computing device are deployed on one road, all the plurality of cameras can communicate with the computing device. Alternatively, if a plurality of cameras and a plurality of computing devices are deployed on one road, one camera may communicate with one computing device, but one computing device may communicate with one or more cameras.

With reference to the accompanying drawings, the following describes the technical solutions provided in the embodiments.

Figure 3:
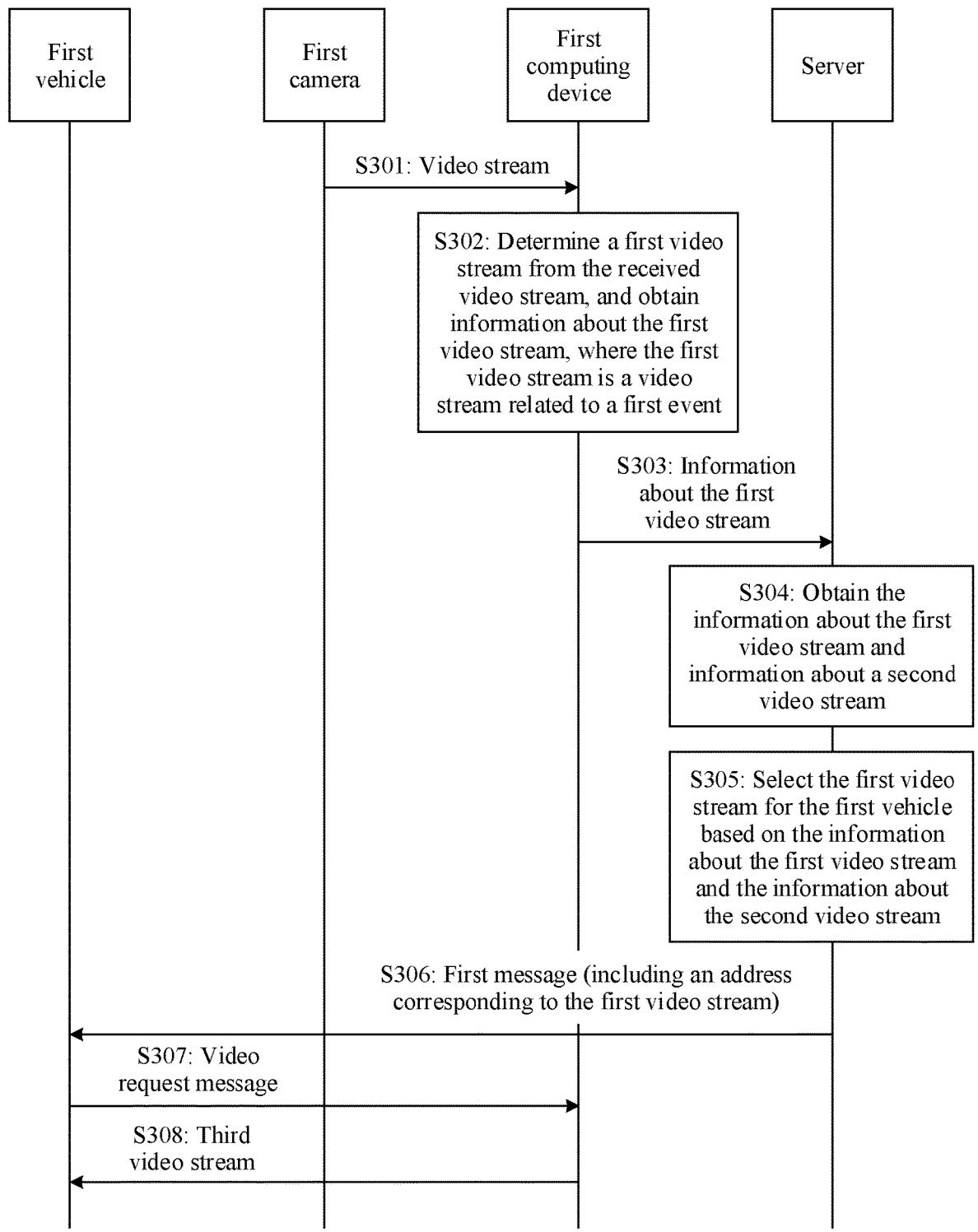
FIG. 3 is a flowchart of a first communication method according to an embodiment.

An embodiment provides a first communication method. FIG. 3 is a flowchart of the method. The following provides a description by using an example in which the method is used in the system architecture shown in FIG. 2A or FIG. 2B.

For ease of description, that the method is performed by a first computing device, a server, an image collection unit, and a vehicle is used as an example below. For example, the server is a V2X server, or may be another server. The image collection unit is, for example, a camera, or may be another apparatus used to collect an image. The following provides a description by using an example in which the image collection unit is a camera. The following operations performed by the vehicle are, for example, performed by an in-vehicle apparatus in the vehicle. In this embodiment, that the method is used in the system architecture shown in FIG. 2A or FIG. 2B is used as an example. Therefore, the first computing device described below may be the computing device in the network architecture shown in FIG. 2A or FIG. 2B, the server described below may be the V2X server in the network architecture shown in FIG. 2A or FIG. 2B, and the camera described below may be the camera in the network architecture shown in FIG. 2A or FIG. 2B, and the vehicle described below may be the vehicle in the network architecture shown in FIG. 2A or FIG. 2B.

S301: The first computing device communicates with one or more cameras, and receives a video stream collected by the one or more cameras. For example, in FIG. 3, the first computing device communicates with a first camera.

After collecting a video stream, a camera may send the collected video stream to a computing device that can communicate with the camera. In this embodiment, it is considered that one camera sends one video stream or channel of video stream to a computing device. The first computing device is used as an example. After collecting a video stream, any camera that can communicate with the first computing device can send the video stream to the first computing device. Therefore, the first computing device may receive one video stream from one camera, or may receive a plurality of video streams from a plurality of cameras.

S302: The first computing device determines a first video stream from the received video stream, and obtains information about the first video stream, where the first video stream is a video stream related to a first event.

One video stream is related to the first event. For example, the video stream records at least an image of the first event. Herein, that one video stream records at least an image of the first event means that the video stream records the image of the first event and in addition to the image of the first event, the video stream may further record another image or may not record another image. If the video stream records another image in addition to the image of the first event, a specific image recorded in the video stream in addition to the image of the first event is not limited in this embodiment. In addition, one video stream includes a plurality of frames of images. In this case, that one video stream is related to the first event may be understood as that each frame of image in all or some images included in the video stream is related to the first event.

The first event is, for example, a special event or an accident that occurs on a road, for example, a traffic accident, a construction event, or a congestion accident. For example, if an event occurs on the road, traffic on the road may not be smooth, or safety of driving a vehicle on the road is reduced. In this case, the event may be considered as the first event.

For example, the first computing device may determine one video stream from the received video streams, and obtain information about the video stream. Alternatively, the first computing device may determine a plurality of video streams from the received video streams, and obtain information about the plurality of video streams. In S302, that the first computing device determines the first video stream is merely used as an example. The first video stream is one of the one or more video streams determined by the first computing device. Each of the one or more video streams described herein is related to the first event. The first computing device may first determine the one or more video streams, and then obtain evaluation information of the one or more video streams.

The following describes a manner in which the first computing device determines one or more video streams.

If the first computing device receives only one video stream from one camera, the first computing device may analyze the video stream, and determine whether the video stream is related to the first event, for example, determine whether the video stream records the image of the first event. If the video stream is related to the first event, the video stream may be used as one video stream determined by the first computing device. The video stream belongs to the one or more video streams. This is equivalent that the first computing device determines one or more video streams. In this case, a quantity of the one or more video streams is 1. Alternatively, if the video stream is unrelated to the first event, the video stream does not belong to the one or more video streams. This is equivalent that S301 is not completed. In this case, the first computing device may continue to receive or wait to receive a video stream from the camera, and continue to analyze whether the video stream is related to the first event.

Alternatively, if the first computing device receives a plurality of video streams from a plurality of cameras, the first computing device may analyze each of all or some of the received video streams, to determine whether each video stream is related to the first event. If one of the video streams is related to the first event, the video stream may be used as one video stream determined by the first computing device, and the video stream belongs to the one or more video streams. If one of the video streams is unrelated to the first event, the video stream does not belong to the one or more video streams. For example, the first computing device finally determines that each of the one or more video streams is related to the first event. This is equivalent that the first computing device determines the one or more video streams.

In addition to this manner, the first computing device may alternatively determine the one or more video streams in another manner. For example, the first computing device may alternatively determine the one or more video streams in a manner to be described below in another embodiment. The manner in which the first computing device determines the one or more video streams is not limited in this embodiment.

After obtaining the one or more video streams, the first computing device may analyze the one or more video streams to obtain information about the one or more video streams. The information about the one or more video streams may include information about each of the one or more video streams. The information about each video stream may include evaluation information of each video stream. Optionally, the information about each video stream may further include an address corresponding to the video stream. An address corresponding to a video stream is an address that is provided by a computing device and that can be used to obtain the video stream. For example, an address corresponding to the first video stream may include an address of the first computing device, for example, an IP address of the first computing device, and the address corresponding to the first video stream may further include a port number corresponding to the first video stream. The port number corresponding to the first video stream is a port number of the first computing device. The first computing device receives the first video stream from a camera through a port corresponding to the port number. Ports of the first computing device may one-to-one correspond to cameras. If the port number of the first computing device is determined, it is equivalent that a corresponding camera is determined.

For example, the first computing device receives a video stream 1 from a camera 1 through a port 1 of the first computing device. If the first computing device determines that the video stream 1 is related to the first event, the first computing device may obtain information about the video stream 1. The information about the video stream 1 may include evaluation information of the video stream 1 and an address corresponding to the video stream 1. The address corresponding to the video stream 1 may include the IP address of the first computing device and a port number of the port 1.

Alternatively, the information about each video stream may not include an address corresponding to the video stream. For example, the server may preconfigure an address corresponding to a video stream. In other words, the server may preconfigure a correspondence between a video stream and an address, or an address corresponding to a video stream is known to the server. In this case, information that is about a video stream and that is obtained by the first computing device may not include an address corresponding to the video stream.

For example, the evaluation information of each of the one or more video streams may include evaluation information of an image included in the video stream. The evaluation information of the image in the video stream may include evaluation information of at least one frame of image in the video stream.

For example, the evaluation information of the image in the video stream may include evaluation information of one frame of image in the video stream, or may include evaluation information of a plurality of frames of images in the video stream. If evaluation information of an image in a video stream includes evaluation information of one frame of image, a representative image in the video stream may be selected as the frame of image. For example, a first frame of image in the video stream, a last frame of image in the video stream, or an intermediate frame of image in the video stream may be selected as the frame of image. Certainly, any frame of image in the video stream may alternatively be selected as the frame of image. Evaluation information of an image in a video stream needs to include only evaluation information of one frame of image. In this way, a process of obtaining the evaluation information of the image in the video stream is relatively simple, and only one frame of image needs to be analyzed. This can improve efficiency of obtaining the evaluation information of the image in the video stream. In addition, one frame of representative image in the video stream may be selected, so that the evaluation information of the image in the video stream can relatively accurately represent a feature of the video stream.

Alternatively, if information about an image in a video stream includes evaluation information of a plurality of frames of images, a manner is: processing the evaluation information of the plurality of frames of images included in the video stream, to finally obtain one piece of evaluation information, and using the evaluation information as the evaluation information of the image in the video stream. In this case, the evaluation information of the image in the video stream may include one piece of evaluation information, and the evaluation information corresponds to the plurality of frames of images. The evaluation information of the plurality of frames of images is processed. For example, a manner is: calculating an average value of the evaluation information of the plurality of frames of images, where the average value may be an arithmetic average value, or may be a weighted average value; and using the average value as the evaluation information of the image in the video stream. Certainly, in addition to the manner of calculating the average value, the evaluation information of the plurality of frames of images may alternatively be obtained in another manner. This is not specifically limited.

Alternatively, if information about an image in a video stream includes evaluation information of a plurality of frames of images, another manner is: skipping processing the evaluation information of the plurality of frames of images, but directly including the evaluation information of the plurality of frames of images in the evaluation information of the image in the video stream. In this case, the evaluation information of the image in the video stream may include a plurality of pieces of evaluation information, and one piece of evaluation information corresponds to one frame of image.

The evaluation information of the plurality of frames of images is used to reflect a feature of the video stream, so that the evaluation information of the image in the video stream can represent the feature of the video stream more accurately.

For example, the evaluation information of the image may include one or more of the following: integrity of the image, a deviation degree of the image, and resolution of the image. Alternatively, it is described as follows: The evaluation information of the image may include one or more of the following: integrity of the image, a deviation degree of the image, or resolution of the image. For example, the evaluation information of the image includes the integrity of the image and the deviation degree of the image; or the evaluation information of the image includes the integrity of the image, the deviation degree of the image, and the resolution of the image.

The integrity of the image may be integrity of content about an event included in the image. For example, the integrity of the image may refer to a ratio of an area of an event detection region in the image to an area of a region of interest (ROI) in the image. Integrity of one frame of image may be a ratio of an area of an event detection region in the image to an area of a region of interest in the image. If one frame of image records a relatively complete image of a related event, integrity of the image may be relatively high. If the image records only a partial image of the related event, integrity of the image may be relatively low. The integrity of the image can be used to measure integrity of content about the related event included in the image. Generally, if one frame of image includes more complete content about the related event, it indicates that the image is worthier to be watched by a user. Therefore, whether the image is worthy to be watched can be measured based on the integrity of the image. As described above, information about a video stream may include evaluation information of one group of images, or include evaluation information of a plurality of groups of images. If the information about the video stream includes the evaluation information of one group of images, the evaluation information of the group of images may correspond to one or more frames of images. If the information about the video stream includes the evaluation information of the plurality of groups of images, the evaluation information of the plurality of groups of images may correspond to a plurality of frames of images. In other words, evaluation information that is of an image and that is included in evaluation information of the video stream may correspond to one or more frames of images. If the evaluation information that is of the image and that is included in the evaluation information of the video stream corresponds to one frame of image, the integrity of the image is integrity of the frame of image. If the evaluation information that is of the image and that is included in the evaluation information of the video stream corresponds to a plurality of frames of images, the integrity of the image is comprehensive integrity of the plurality of frames of images. For example, integrity of the plurality of frames of images may be obtained based on integrity of each of the plurality of frames of images.

The deviation degree of the image may be a deviation degree of a geometric center of an event detection region in one frame of image relative to a center position of the image. Alternatively, the deviation degree of the image may be a deviation degree of a geometric center of an event detection region in one frame of image relative to a center position of an ROI region in the image. Whether content corresponding to an event related to the image is centered in the first image may be measured based on the deviation degree of the image. Generally, if the content is more centered in the image, it indicates that watching experience of a user is better. Therefore, whether the image is worthy to be watched can be measured based on the deviation degree of the image. The evaluation information that is of the image and that is included in the evaluation information of the video stream may correspond to one or more frames of images. If the evaluation information that is of the image and that is included in the evaluation information of the video stream corresponds to one frame of image, the integrity of the image is integrity of the frame of image. If the evaluation information that is of the image and that is included in the evaluation information of the video stream corresponds to a plurality of frames of images, the deviation degree of the image is a comprehensive deviation degree of the plurality of frames of images. For example, a deviation degree of the plurality of frames of images may be obtained based on a deviation degree of each of the plurality of frames of images.

In an optional implementation, information about a video stream may include not only evaluation information of the video stream and an address corresponding to the video stream, but also include information about an event related to the video stream. The information about the event may include one or more of the following: type information of the event, an identifier of the event, information about a position at which the event occurs, and information about a time at which the event occurs. Alternatively, it is described as follows: The information about the event may include one or more of the following: type information of the event, an identifier of the event, information about a position at which the event occurs, or information about a time at which the event occurs. For example, the information about the event includes the type information of the event and the information about the position at which the event occurs; or the information about the event includes the type information of the event, the information about the position at which the event occurs, and the information about the time at which the event occurs; or the information about the event includes the type information of the event, the identifier of the event, the information about the position at which the event occurs, and the information about the time at which the event occurs. That the one or more video streams determined by the first computing device are used as an example. In this case, the event may be the first event.

A type of the event includes, for example, a traffic accident type, a congestion type, or a road construction type.

The identifier of the event is, for example, an identity (ID) of the event. For example, a computing device may allocate an ID to the event. Identifiers (for example, IDs) allocated by different computing devices for a same event may be the same.

The information about the position at which the event occurs may indicate the position at which the event occurs. For example, the information is coordinate information of the position at which the event occurs.

The information about the time at which the event occurs is equivalent to a timestamp of the event.

One frame of image may include a region of interest. The region of interest is, for example, an ROI region. An ROI region is one image region selected from a to-be-processed image, for example, a region that is outlined in a shape such as a square, a circle, an ellipse, or an irregular polygon in the to-be-processed image and that needs to be processed. The region of interest is used to outline an object that is expected to be focused on. This can reduce a processing time and improve processing precision.

An event detection region may also be referred to as an accident detection region or the like, and may be located in the region of interest. In other words, the region of interest may include the event detection region. The event detection region may record an image of an event related to a video stream. For example, the event is the first event. For example, the region of interest may be a relatively large region, and the image of the first event is recorded in the region of interest. However, in addition to the image of the first event, the region of interest may further record another image. In this case, an accident detection region may be further set, and a proportion of an area of the image of the first event in the accident detection region may be greater than a proportion of an area of the image of the first event in the region of interest. If the accident detection region is set, the image of the first event can be better analyzed.

Figure 4:
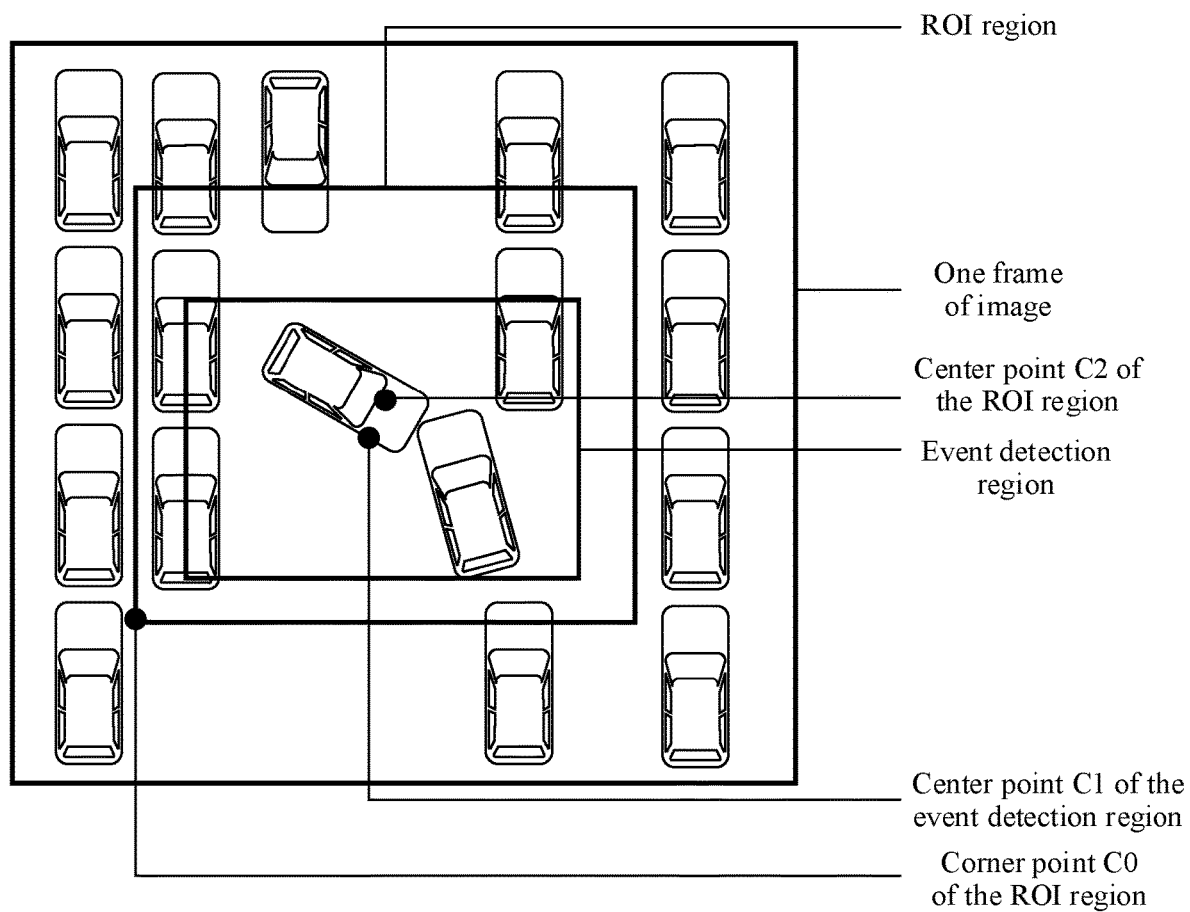
FIG. 4 is a schematic diagram of analyzing an image according to an embodiment.

FIG. 4 is a schematic diagram of performing region division on an image in an image processing process. For example, FIG. 4 shows one frame of image included in the first video stream. It can be learned from FIG. 4 that, a region outlined by an outermost rectangle represents a complete region of the image, a region outlined by an intermediate rectangle represents an ROI region, and a region outlined by an innermost rectangle represents an event detection region. The event detection region is included in the ROI region. In FIG. 4, C1 represents a center point of the event detection region, C2 represents a center point of the ROI region, and C0 represents an endpoint or corner point of the ROI region.

The first computing device can determine an area of the event detection region, and can also determine an area of the ROI region. Then, the first computing device can determine integrity of the image based on the area of the event detection region and the area of the ROI region. For example, integrity of the image=area of the event detection region in the image/area of the ROI region in the image.

The first computing device may further determine a deviation degree of the image. For example, the first computing device can determine a position of the center point C2 (for example, a geometric center) of the ROI region in the image, a position of the center point C1 (for example, a geometric center) of the event detection region in the image, and a position of the endpoint C0 of the region of interest in the image. Then, the first computing device may determine the deviation degree of the image based on the position of the center point C2 of the ROI region in the image, the position of the center point C1 of the event detection region in the image, and the position of the endpoint C0 of the ROI region in the image. For example, deviation degree of the image=(C1−C2)/(C2−C0). C1−C2 represents a geometric distance between C1 and C2, and C2−C0 represents a geometric distance between C2 and C0. In FIG. 4, C0 represents the endpoint on the lower left of the ROI region. Actually, C0 may represent any endpoint of the ROI region. That C0 represents the endpoint on the lower left of the ROI region is merely used as an example in FIG. 4.

When obtaining evaluation information of the image, the first computing device needs to use some parameters, for example, one or more of parameters such as coordinates that are of content included in the image and that are in a pixel coordinate system, a shape of the region of interest (for example, a height or a width of the region of interest), or a shape of the event detection region (for example, a height or a width of the event detection region); and the first computing device may learn of the parameters by analyzing the image.

S303: The first computing device sends the information about the first video stream to the server, and the server receives the information about the first video stream from the first computing device.

As described in S302, the first computing device may determine the information about the one or more video streams. Then, the first computing device may send the determined information about the one or more video streams to the server, and the server may receive the information about the one or more video streams. In S303, the information about the first video stream is merely used as an example. If the first computing device sends only information about one video stream to the server, the information about the video stream is the information about the first video stream. Alternatively, if the first computing device sends information about a plurality of video streams to the server, the information about the first video stream may be one of the information about the plurality of video streams.

S304: The server obtains the information about the first video stream and information about a second video stream, where information about each video stream includes evaluation information of the video stream and an address corresponding to the video stream, and the first video stream and the second video stream are video streams related to the first event.

Actually, one or more computing devices may send information about at least one video stream to the server, and each computing device may send information about one or more video streams to the server. Therefore, the server may obtain the information about the at least one video stream from the one or more computing devices. In S304, the information about the first video stream and the information about the second video stream are merely used as an example.

The server receives the information about the first video stream from the first computing device in S303, that is, obtains the information about the first video stream. Therefore, the step of obtaining the information about the first video stream by the server in S304 may be considered as a same step as S303. Alternatively, the information about the second video stream may also be sent by the first computing device to the server, or the information about the second video stream may be sent by another computing device to the server, for example, sent by a second computing device to the server. In this case, that the server obtains the information about the second video stream may be that the second computing device sends the information about the second video stream to the server and the server receives the information about the second video stream from the second computing device. Likewise, the information about the second video stream may include evaluation information of the second video stream and an address corresponding to the second video stream. For a manner in which the second computing device determines the information about the second video stream, refer to the description of the manner in which the first computing device determines the information about the first video stream.

If a computing device needs to send information about a plurality of video streams to the server, the computing device may perform multipath transmission, to send the information about the plurality of video streams to the server. Each transmission path is used to send information about one video stream. In addition, the video stream sent through each transmission path may correspond to one address. In other words, each transmission path may correspond to one address. For example, the address corresponding to the video stream sent through each transmission path includes not only an address of the computing device, but also a port number of the computing device; and a port corresponding to the port number is a port used by the computing device to receive the video stream. After receiving one video stream, the server may determine an address corresponding to the video stream. In other words, the server may determine an address of a computing device that sends the video stream, and determine a port number of the computing device.

For example, the first computing device receives a video stream 1 from a camera 1 through a port 1 of the first computing device, and receives a video stream 2 from a camera 2 through a port 2 of the first computing device. The first computing device determines that both the video stream 1 and the video stream 2 are related to the first event. The first computing device obtains information about the video stream 1 and information about the video stream 2 by analyzing the video stream 1 and the video stream 2. The first computing device sends the information about the video stream 1 to the server through a first transmission path, and sends the information about the video stream 2 to the server through a second transmission path. An address corresponding to the information about the video stream 1 may include the address of the first computing device and a port number of the port 1, and an address corresponding to the information about the video stream 2 may include the address of the first computing device and a port number of the port 2.

Alternatively, if information about a video stream does not include an address corresponding to the video stream, the first computing device may send information about a plurality of video streams to the server through one transmission path. After receiving the information about the plurality of video streams, the server may determine, based on known information, an address corresponding to each of the plurality of video streams.

S305: The server selects the first video stream for a first vehicle based on the information about the first video stream and the information about the second video stream.

There may be one or more vehicles on a road on which the first event occurs. The server may actively select video streams for all vehicles or some vehicles on the road. The first vehicle may be one of the vehicles for which the server actively selects the video streams. Alternatively, if a vehicle requires the server to select a video stream, the vehicle may send, to the server, a message used to request the video stream. After receiving the message, the server may select the video stream for the vehicle. For example, the first vehicle sends, to the server, a message used to request a video stream. After receiving the message from the first vehicle, the server may select the video stream for the first vehicle.

A specific vehicle for which the server may select a video stream is not limited in this embodiment.

If the server needs to select video streams for a plurality of vehicles, a selection manner is similar for each vehicle. Therefore, in S305, that the server selects a video stream for the first vehicle is merely used as an example.

As described in S304, the server may obtain the information about the at least one video stream. Then, in S305, the server may select the first video stream from the at least one video stream for the first vehicle based on the information about the at least one video stream. Currently, in S305, that the server selects a video stream for the first vehicle based on the information about the first video stream and the information about the second video stream is merely used as an example. The information about the first video stream and the information about the second video stream belong to the information about the at least one video stream.

For example, the server selects the information about the first video stream from the information about the at least one video stream for the first vehicle based on the information about the at least one video stream, where the information about the first video stream corresponds to the first video stream. This is equivalent that the server selects the information about the video stream. If the information about the video stream is selected, it may be considered that the video stream is selected.

The server may select a video stream for a vehicle in different selection manners. The following describes a manner in which the server selects a video stream for the first vehicle.

As described above, the information about each video stream may include the evaluation information of the video stream. Then, the server may determine an evaluation score of each of the at least one video stream based on the evaluation information of the video stream. The evaluation score of each video stream may be determined based on evaluation information of an image in the video stream. For evaluation information of an image in a video stream, refer to the foregoing descriptions. The server may select the first video stream from the at least one video stream for the first vehicle based on an evaluation score of the at least one video stream.

In an optional manner, that the server determines an evaluation score of a video stream based on evaluation information of the video stream may be implemented as follows: The server determines the evaluation score of the video stream based on the evaluation information of the video stream and a matching degree between the video stream and the first vehicle. A matching degree between a video stream and a vehicle may be measured based on a matching degree between an image included in the video stream and the vehicle. In addition, a matching degree between a video stream and a vehicle may also be understood as a priority of the video stream relative to the vehicle.

The server may correspondingly determine a matching degree between each frame of image in all images or some images included in one video stream and the first vehicle. A matching degree between one frame of image and the first vehicle may be determined based on content of the image and a position of the first vehicle. In other words, a matching degree between one frame of image and the first vehicle may be determined based on deployment information of a camera that collects the image and position information of the first vehicle. For example, information about a video stream may further include an identifier of an image collection unit that collects the video stream. In this embodiment, that the image collection unit is a camera is used as an example. Therefore, the information about the video stream may include an identifier of the camera that collects the video stream. The server may obtain deployment information of the camera based on the identifier that is of the camera and that is included in the information about the video stream. For example, the deployment information of the camera includes parameters such as information about a position and field of view of the camera. For example, the position information of the first vehicle includes at least one of driving route information of the first vehicle and lane information of the first vehicle. The at least one of the driving route information of the first vehicle and the lane information of the first vehicle may include the driving route information of the first vehicle, or include the lane information of the first vehicle, or include the driving route information of the first vehicle and the lane information of the first vehicle.

For example, the server may determine a matching degree between each of the at least one video stream and the first vehicle based on the information about the position and field of view of the camera and based on the at least one of the driving route information of the first vehicle and the lane information of the first vehicle. Specifically, that the server determines a matching degree between each video stream and the first vehicle based on the information about the position and field of view of the camera and based on the at least one of the driving route information of the first vehicle and the lane information of the first vehicle may be implemented as follows: The server determines a matching degree between each frame of image in all or some images included in each video stream and the first vehicle based on the information about the position and field of view of the camera and based on the at least one of the driving route information of the first vehicle and the lane information of the first vehicle. The matching degree between the image included in the video stream and the first vehicle can reflect the matching degree between the video stream and the first vehicle.

Herein, the matching degree between the video stream and the vehicle may be understood as a matching degree between the video stream and a field of vision of a passenger in the vehicle. For example, if a camera that collects one frame of image is located in a same lane as the first vehicle, and the camera is located on an opposite side of the first vehicle, an angle of view for photographing by the camera can cover the first vehicle. In this case, if a passenger in the first vehicle watches the image, the passenger can see relatively complete content about the first event. In this case, a matching degree between the image and the first vehicle is relatively high. Alternatively, for example, if a camera that collects one frame of image is located in a lane different from a lane in which the first vehicle is located, an angle of view for photographing by the camera cannot cover the first vehicle. In this case, if a passenger in the first vehicle watches the image, the passenger cannot see relatively complete content about the first event. In this case, a matching degree between the image and the first vehicle is relatively low.

It can be learned that the foregoing describes the matching degree based on the vehicle. In other words, the foregoing describes the matching degree between the image and the vehicle. In this case, matching degrees between a same frame of image and different vehicles may be the same or different. For example, the server obtains evaluation information of at least one video stream, where each of the at least one video stream includes one or more frames of images. If the server needs to select a video stream for only one vehicle, the server may determine a matching degree between each frame of image in all or some images included in the at least one video stream and the vehicle. Alternatively, if the server needs to select video streams for a plurality of vehicles, the server may determine a matching degree between each frame of image in all or some images included in the at least one video stream and each of the plurality of vehicles. In this embodiment, that the server selects a video stream for the first vehicle is used as an example. Therefore, this specification mainly describes a matching degree between an image and the first vehicle.

Each of the at least one video stream may correspond to one evaluation score. One frame of image may also correspond to one evaluation score. For differentiation, an evaluation score corresponding to an image may be referred to as a sub-evaluation score. One frame of image corresponds to one sub-evaluation score. One video stream includes at least one frame of image. Therefore, it may also be considered that one video stream corresponds to at least one sub-evaluation score. An evaluation score corresponding to one video stream may be obtained based on a sub-evaluation score of an image included in the video stream. For example, if evaluation information of an image in one video stream includes evaluation information of one frame of image, an evaluation score of the video stream may be obtained based on a sub-evaluation score of the frame of image included in the video stream. Alternatively, if evaluation information of an image in one video stream includes evaluation information of a plurality of frames of images, an evaluation score of the video stream may be obtained based on a plurality of sub-evaluation scores of the plurality of frames of images included in the video stream. If an evaluation score of one video stream is obtained based on a sub-evaluation score of one frame of image included in the video stream, the frame of image is, for example, a first frame of image included in the video stream, a last frame of image included in the video stream, an intermediate frame of image included in the video stream, or any frame of image included in the video stream. Alternatively, if an evaluation score of one video stream is obtained based on a plurality of sub-evaluation scores of a plurality of frames of images included in the video stream, the plurality of frames of images may be all images included in the video stream or some images included in the video stream.

If an evaluation score of one video stream is obtained based on a sub-evaluation score of one frame of image included in the video stream, in a manner, the sub-evaluation score of the image may be directly used as the evaluation score of the video stream; or the sub-evaluation score of the image may be multiplied by a coefficient or weighted value, and an obtained value is used as the evaluation score of the video stream. The coefficient may be specified in a protocol, or may be determined by the server. For example, an evaluation score of a video stream 1 is obtained based on a sub-evaluation score of an image 1 included in the video stream 1. For example, the sub-evaluation score of the image 1 is 2. In this case, the evaluation score of the video stream 1 may be equal to 2. Alternatively, the evaluation score of the video stream 1 may be equal to 2×f, where f is a coefficient.

Alternatively, if an evaluation score of one video stream is obtained based on a plurality of sub-evaluation scores of a plurality of frames of images, in a manner, the plurality of sub-evaluation scores may be directly added up, and an obtained value is used as the evaluation score of the video stream; or each of some or all of the plurality of sub-evaluation scores may be multiplied by a coefficient, then sub-evaluation scores obtained through weighted multiplication are added up, and an obtained value is used as the evaluation score of the video stream. Coefficients multiplied by different sub-evaluation scores may be the same or different. These coefficients may be specified in a protocol, or may be determined by the server. For example, an evaluation score of a video stream 1 is obtained based on a sub-evaluation score of an image 1 included in the video stream 1 and a sub-evaluation score of an image 2 included in the video stream 1, the sub-evaluation score of the image 1 is 2, and the sub-evaluation score of the image 2 is 2.5. In this case, the evaluation score of the video stream 1 may be equal to 2+2.5=4.5; or the evaluation score of the video stream 1 may be equal to 2×h+2.5×g, where both h and g are coefficients, and h and g may be the same or different.

Manners in which the server determines sub-evaluation scores of all frames of images are similar. Therefore, the following describes, by using one frame of image included in the first video stream as an example, a manner in which the server determines a sub-evaluation score of the image.

For example, the server may determine the sub-evaluation score of the image based on integrity of the image, a deviation degree of the image, and a matching degree between the image and the first vehicle. In an optional implementation, the sub-evaluation score, determined by the server, of the image may satisfy the following Formula 1:

$$\text{Total score} = a \times [area]\_detection / [area]\_ROI -$$
$$b \times distance(C2 - C1) / distance(C2 - C0) +$$
$$c \times [fov]\_priority(i) / sum([fov]\_priority(i))$$

In Formula 1, the total score represents a value of the sub-evaluation score of the image, in other words, represents the sub-evaluation score of the image; a, b, and c are all weight parameters, and may be constants specified in advance; [area]_detection represents an area of an event detection region in the image; [area]_ROI represents an area of a region of interest in the image; C1 represents a center point of the event detection region, C2 represents a center point of the region of interest, and C0 represents an endpoint of the region of interest; distance(C2−C1) represents a geometric distance between C2 and C1; likewise, distance (C2−C0) represents a geometric distance between C2 and C0; [fov]_priority(i) represents the matching degree between the image and the first vehicle; and sum([fov] _priority(i)) represents a sum of matching degrees between all or some images included in a video stream to which the image belongs and the first vehicle, where the some or all images are images used to obtain the sub-evaluation score of the image.

It can be learned from Formula 1 that a larger ratio of an area of an event detection region in one frame of image to an area of a region of interest in the image indicates a higher sub-evaluation score of the image. In addition, to avoid a case in which the event detection region is located at a position that is greatly deviating from a main field of vision, for example, the event detection region may be located at an edge position of the image and is inconvenient for watching, a deviation degree of the image needs to be further subtracted. In other words, if the event detection region in the image is closer to a center of the region of interest, it indicates that the sub-evaluation score of the image is higher. Then, the matching degree between the image and the first vehicle is added. For example, when a sub-evaluation score of one frame of image relative to a vehicle is to be determined, a higher matching degree between the image and the vehicle indicates a higher sub-evaluation score of the image. In this manner of determining a sub-evaluation score of an image, an image with a higher sub-evaluation score is an image that can provide more valuable information for a passenger in a vehicle. In other words, the image with the higher sub-evaluation score is an image that can be selected for the vehicle.

It may be learned that a sub-evaluation score of one frame of image relative to the first vehicle may be obtained based on evaluation information of the image and a matching degree between the image and the first vehicle, and an evaluation score of a video stream may be obtained based on one or more sub-evaluation scores of one or more frames of images included in the video stream. In addition, a matching degree between the video stream and the first vehicle may also be reflected by a matching degree between an image included in the video stream and the first vehicle. Therefore, it is considered that the server may determine, based on evaluation information of the video stream and the matching degree between the video stream and the first vehicle, the evaluation score of the video stream relative to the first vehicle.

The server may select the first video stream from the at least one video stream for the first vehicle based on an evaluation score of the at least one video stream. For example, the server may determine an evaluation score for each of the at least one video stream, and the server may select, for the first vehicle, a corresponding video stream with an evaluation score having the highest value, where the video stream is the first video stream. In other words, an evaluation score corresponding to the first video stream selected by the server is higher than or greater than an evaluation score corresponding to each of other video streams in the at least one video stream. For example, if the server determines that the evaluation score of the first video stream is greater than an evaluation score of the second video stream, the server selects the first video stream for the first vehicle. If there are two or more video streams in the at least one video stream that correspond to a same evaluation score and the evaluation score is the highest, the server may select one video stream from the two or more video streams as the first video stream.

For example, the at least one video stream includes three video streams in total. An evaluation score of a video stream 1 is 5, an evaluation score of a video stream 2 is 11, and an evaluation score of a video stream 3 is 7. It can be learned that in the three video streams, the evaluation score of the video stream 2 is the highest. Therefore, the server may select the video stream 2 for the first vehicle. In other words, the video stream 2 is the first video stream. Alternatively, an evaluation score of a video stream 1 is 5, an evaluation score of a video stream 2 is 11, and an evaluation score of a video stream 3 is also 11. In this case, it can be learned that in the three video streams, the evaluation score of the video stream 2 is the same as the evaluation score of the video stream 3, and both are the highest. Therefore, the server may select the video stream 2 or the video stream 3 as the first video stream.

In this embodiment, an evaluation score of one video stream may be obtained based on a plurality of sub-evaluation scores of a plurality of frames of images included in the video stream. In this case, the server may comprehensively consider the plurality of sub-evaluation scores corresponding to the video stream, so that evaluation is more comprehensive, and a selection result can be more accurate. Alternatively, an evaluation score of one video stream may be obtained based on one sub-evaluation score of one frame of image included in the video stream. In this case, the server only needs to calculate the sub-evaluation score corresponding to the frame of image. This is equivalent that sampling is performed. For example, a representative image may be selected as the frame of image. For example, a first frame of image in the video stream is selected as the frame of image. This can ensure accuracy of an evaluation result, and reduce a workload of the server.

In an optional implementation, when selecting a video stream for the first vehicle, the server may further consider another factor in addition to the evaluation score of the video stream. For example, the server may further consider a parameter such as resolution of an image included in the video stream, to select a more appropriate video stream for the first vehicle. For example, if there are two video streams having a same evaluation score and the evaluation score is the highest, but resolution of an image included in one of the video streams is higher, the server may select the video stream including the image with the higher resolution as the first video stream. Higher resolution of an image indicates higher definition of the image. Therefore, watching experience of a user can be improved.

S306: The server sends a first message to the first vehicle, where the first message includes the address corresponding to the first video stream. The first vehicle receives the first message from the server, and may obtain the address included in the first message.

That the server is the V2X server is used as an example. Based on the system architecture shown in FIG. 2A, the V2X server may send the first message to the first vehicle through the base station. Alternatively, based on the system architecture shown in FIG. 2B, the V2X server may send the first message to the first vehicle through the base station and the RSU.

The address corresponding to the first video stream may include an address of a computing device corresponding to the first video stream, and include a port number of the computing device. A port corresponding to the port number is a port through which the computing device receives the first video stream. It can be learned from the descriptions in S303 that, in this embodiment, that the first video stream corresponds to the first computing device is used as an example. Therefore, the address corresponding to the first video stream may include the address of the first computing device and the port number of the port used by the first computing device to receive the first video stream. In addition, ports of the computing device may one-to-one correspond to cameras. If the port number of the computing device is determined, it is equivalent that a corresponding camera is determined.

It should be noted that, that the first message includes the address corresponding to the first video stream is merely an optional manner. In another implementation, the first message may alternatively not include the address corresponding to the first video stream. For example, as described above, the server may preconfigure the address corresponding to the video stream. In other words, the server may preconfigure a correspondence between a video stream and an address. If this manner is used, the server may send the configured correspondence between a video stream and an address to the first vehicle in advance. In this case, the server needs to send only the first message to the first vehicle, where the first message may be used to indicate the first video stream, or the first message may be used to indicate the first vehicle to request the first video stream. The first vehicle may learn of, based on the correspondence that is between a video stream and an address and that is configured by the server, the address corresponding to the first video stream. In this case, the first message in S306 may not include the address corresponding to the first video stream.

In an optional implementation, to enable the first vehicle to obtain more information, the server may not only send the address corresponding to the first video stream to the first vehicle, but also send, to the first vehicle, one or more of the following information: information about a position at which the first event occurs, type information of the first event, information about a time at which the first event occurs, and information about a road on which the first vehicle is located. Alternatively, it is described as follows: The server may send, to the first vehicle, one or more of the following information: information about a position at which the first event occurs, type information of the first event, information about a time at which the first event occurs, or information about a road on which the first vehicle is located.

For example, the server may send, to the first vehicle, the information about the position at which the first event occurs, so that the first vehicle can determine the position at which the first event occurs; or the server may send the information about the position at which the first event occurs and the type information of the first event to the first vehicle, so that the first vehicle can determine the position at which the first event occurs, and can also learn of a type of the first event; or the server may send, to the first vehicle, the information about the position at which the first event occurs and the information about the time at which the first event occurs, so that the first vehicle can determine the position at which the first event occurs, and can also learn of the time at which the first event occurs; or the server may send, to the first vehicle, the information about the position at which the first event occurs, the type information of the first event, the information about the time at which the first event occurs, and the information about the road on which the first vehicle is located, so that the first vehicle can determine the position at which the first event occurs and a type of the first event, and can also learn of the time at which the first event occurs and the road on which the first vehicle is located.

S307: The first vehicle sends a video request message to the first computing device, and the first computing device receives the video request message from the first vehicle. The video request message is used to request the first video stream in the at least one video stream.

The first vehicle may obtain, from the first message, the address corresponding to the first video stream, or may determine, based on the correspondence that is between a video stream and an address and that is configured by the server, the address corresponding to the first video stream. After obtaining the address corresponding to the first video stream, the first vehicle may establish a connection to the first computing device based on the address of the first computing device that is included in the address corresponding to the first video stream, and send the video request message to the first computing device through the established connection, to request to obtain the first video stream, in other words, request to obtain a video stream including content about the first event. The video request message may include a port number of the first computing device. The port number is the port number included in the address corresponding to the first video stream.

Based on the system architecture shown in FIG. 2A, the first vehicle may send the video request message to the first computing device through the base station and the V2X server. Alternatively, based on the system architecture shown in FIG. 2B, the first vehicle may send the video request message to the first computing device through the RSU, the base station, and the V2X server.

S308: The first computing device sends a third video stream to the first vehicle, and the first vehicle receives the third video stream from the first computing device.

For example, if the video request message may include the port number of the first computing device, the first computing device may determine, based on the port number, that the first vehicle requests a video stream from a port corresponding to the port number, and the first computing device may determine that the port corresponds to the first camera. For example, the first camera continually sends a collected video stream to the first computing device. After the first vehicle establishes the connection to the first computing device, the first computing device may send the video stream from the first camera to the first vehicle. However, because the first camera collects a video stream in real time, when the first computing device sends a video stream from the first camera to the first vehicle, the to-be-sent video stream is not the first video stream, but a video stream collected by the first camera in real time, for example, referred to as a third video stream. In this way, the first vehicle can obtain real-time road condition information, and it is more convenient for the passenger in the first vehicle to learn a current condition on a road.

Based on the system architecture shown in FIG. 2A, the first computing device may send the third video stream to the first vehicle through the V2X server and the base station. Alternatively, based on the system architecture shown in FIG. 2B, the first computing device may send the third video stream to the first vehicle through the V2X server, the base station, and the RSU.

After receiving the third video stream, the first vehicle may play the third video stream through an apparatus such as a display on the first vehicle. In this case, the passenger in the first vehicle can watch the third video stream, to obtain information about the first event. The third video stream is a video stream that better matches the first vehicle. Therefore, the passenger in the first vehicle can obtain relatively complete content about the first event by watching the third video stream. Further, in addition to playing the third video stream, the vehicle may further indicate a camera corresponding to the third video stream. For example, the vehicle may display an identifier of the camera through the display, or identify a position of the camera on a map displayed on the display, so that it is more convenient for the passenger in the first vehicle to position the camera.

According to the method provided in this embodiment, the server may select the first video stream for the first vehicle. The first video stream may be a video stream selected after the evaluation information of the first video stream and the evaluation information of the second video stream are analyzed. For example, the first video stream may be a video stream that has a highest score or a higher score in the at least one video stream and that is selected after the at least one video stream is evaluated by using a specific algorithm. In other words, the first video stream may be a video stream that better matches the first vehicle. In other words, by watching the first video stream, the passenger in the first vehicle can see relatively complete content about the first event. In this way, the server can match an appropriate video stream for the vehicle, and the vehicle does not need to autonomously select a video stream. Even if a relatively urgent case occurs, the vehicle can obtain a video stream in time because the server selects the video stream without a need of a manual operation by a user. This improves efficiency of obtaining a valuable video stream by the vehicle. In addition, the first vehicle can learn of a complete picture of the first event, and therefore the first vehicle can effectively avoid a pedestrian, another vehicle, or the like. This reduces a collision possibility, and improves driving safety.

Figure 5:
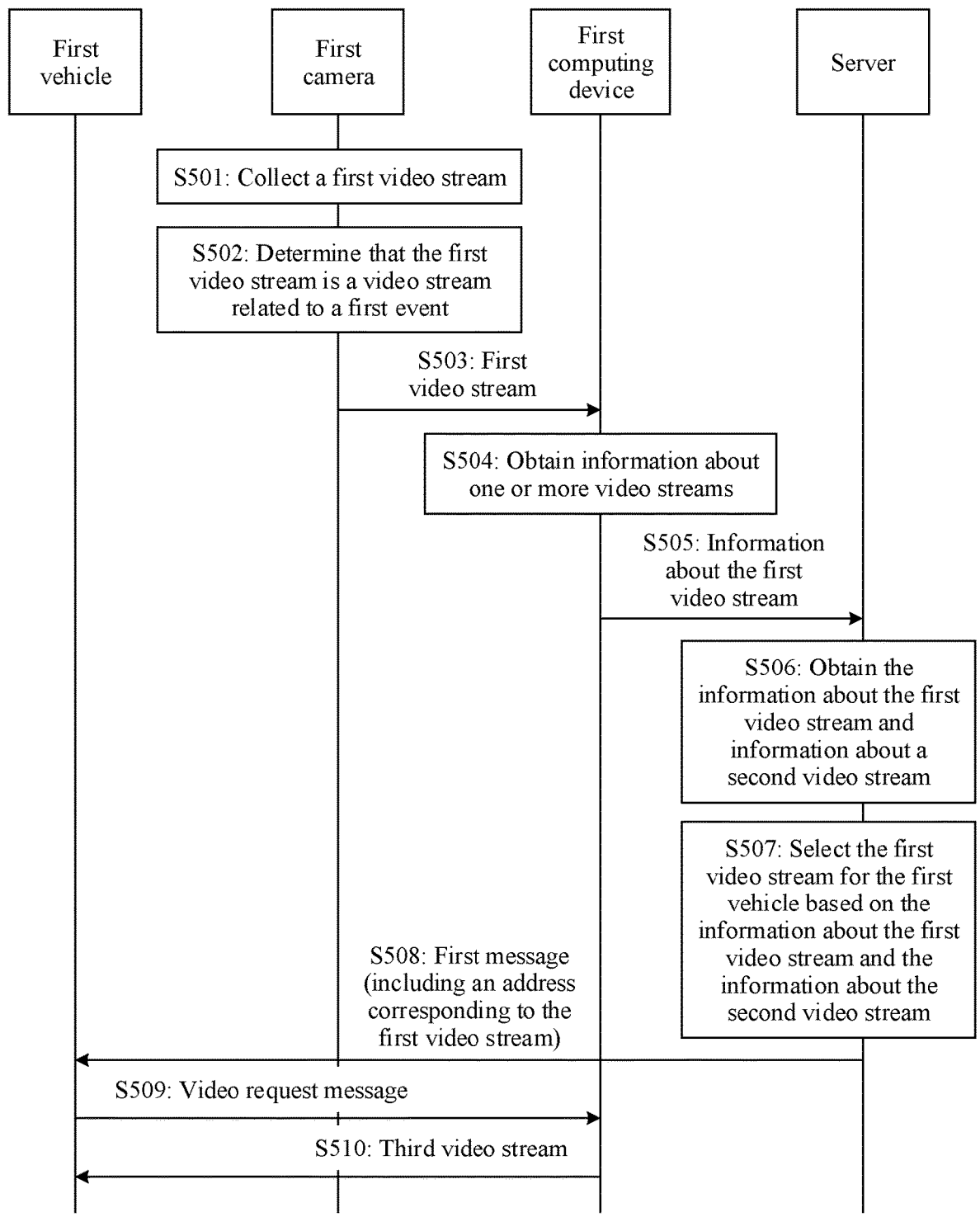
FIG. 5 is a flowchart of a second communication method according to an embodiment.

To resolve the same technical problem, an embodiment provides a second communication method. FIG. 5 is a flowchart of the method. The following provides a description by using an example in which the method is used in the system architecture shown in FIG. 2A or FIG. 2B.

For ease of description, that the method is performed by a first computing device, a server, an image collection unit, and a vehicle is used as an example below. For example, the server is a V2X server, or may be another server. The image collection unit is, for example, a camera, or may be another apparatus used to collect an image. The following provides a description by using an example in which the image collection unit is a camera. The following operations performed by the vehicle are, for example, performed by an in-vehicle apparatus in the vehicle. In this embodiment, that the method is used in the network architecture shown in FIG. 2A or FIG. 2B is used as an example. Therefore, the first computing device described below may be the computing device in the network architecture shown in FIG. 2A or FIG. 2B, the server described below may be the V2X server in the network architecture shown in FIG. 2A or FIG. 2B, and the camera described below may be the camera in the network architecture shown in FIG. 2A or FIG. 2B, and the vehicle described below may be the vehicle in the network architecture shown in FIG. 2A or FIG. 2B.

S501: A first camera collects a first video stream.

The first camera may be any camera deployed on a road, and can communicate with a computing device deployed on the road. The first camera can collect a video stream in real time.

S502: The first camera determines that the first video stream is a video stream related to a first event.

For descriptions of the first event, a meaning that a video stream is related to the first event, and the like, refer to related descriptions in S302 in the embodiment shown in FIG. 3.

In this embodiment, the camera has a specific analysis capability. After collecting the first video stream, the first camera may analyze the first video stream, to determine whether the first video stream is related to the first event. For example, if the first video stream records an image of the first event, the first camera considers that the first video stream is related to the first event; or if the first video stream records no image of the first event, the first camera considers that the first video stream is unrelated to the first event. In S502, that the first camera determines that the first video stream is related to the first event is used as an example. However, if the first camera determines that the first video stream is unrelated to the first event, it is equivalent that S502 is not completed. In this case, subsequent steps may not need to be performed, and S501 may continue to be performed.

In an optional manner, in addition to analyzing whether the first video stream is related to the first event, the first camera may perform further analysis. For example, if the first camera determines that the first video stream is related to the first event, the first camera may further analyze the first video stream to obtain information about the first video stream. For example, the information about the first video stream may include evaluation information of the first video stream.

For example, the evaluation information of the first video stream may include evaluation information of an image included in the first video stream. For example, the evaluation information of the image in the first video stream may include evaluation information of at least one frame of image in the first video stream. For the evaluation information of the image included in the first video stream, content included in the evaluation information of the image, and the like, refer to related descriptions in S302 in the embodiment shown in FIG. 3.

In an optional implementation, in addition to the evaluation information of the first video stream, the information about the first video stream may further include information about the first event. For content included in the information about the first event, refer to related descriptions in S302 in the embodiment shown in FIG. 3.

In addition, for more descriptions of the information about the video stream, refer to related descriptions in the embodiment shown in FIG. 3.

S503: The first camera sends the first video stream to the first computing device, and the first computing device receives the first video stream from the first camera.

In an optional manner, as described in S502, the first camera may further obtain the information about the first video stream. In this case, the first camera may further send the information about the first video stream to the first computing device, and the first computing device may receive the information about the first video stream from the first camera.

The first computing device can communicate with one or more cameras. After collecting one or more video streams, the one or more cameras may send the video streams to the first computing device; and the first computing device may receive one video stream from one camera, or may receive a plurality of video streams from a plurality of cameras. Therefore, the first computing device may obtain one or more video streams. The first video stream may be one of the one or more video streams. In this embodiment, because the camera has the specific analysis capability, all video streams received by the first computing device are video streams related to the first event, and the first computing device does not need to analyze whether the received video streams are related to the first event. This reduces a workload of the computing device. Further, if the camera also sends information about a video stream to the first computing device, the first computing device may neither need to obtain the information about the video stream through analysis. This can further reduce the workload of the first computing device.

S504: The first computing device obtains information about the one or more video streams.

The information about the one or more video streams includes the information about the first video stream.

If the camera only determines that a video stream is related to the first event, but does not obtain information about the video stream, after obtaining the one or more video streams, the first computing device may analyze the one or more obtained video streams to obtain the information about the one or more video streams. Alternatively, if the camera not only determines that a collected video stream is related to the first event, but also obtains information about the collected video stream through analysis, the first computing device may receive the information about the one or more video streams in addition to the one or more video streams.

If information about a video stream is obtained through analysis by a camera, the information that is about the video stream and that is obtained by the camera may not include an address corresponding to the video stream. In this case, the first computing device may add the address corresponding to the video stream to the information about the video stream, to obtain updated information about the video stream. For example, an address corresponding to the first video stream may include an address of the first computing device and a port number of the first computing device. The first computing device receives the first video stream through a port corresponding to the port number, and the first computing device may add the address corresponding to the first video stream to the information about the first video stream.

Alternatively, information about a video stream may not include an address corresponding to the video stream. For example, the server may preconfigure an address corresponding to a video stream. In other words, the server may preconfigure a correspondence between a video stream and an address, or an address corresponding to a video stream is known to the server. In this case, the first computing device neither need to obtain an address corresponding to the first video stream, nor need to add the address corresponding to the first video stream to the information about the first video stream.

In addition, if the information about the video stream includes information about a position at which an event occurs, the information about the position at which the event occurs may be obtained by a camera and sent to the first computing device by the camera. Alternatively, some cameras may not have a capability of obtaining the information. In this case, information that is about a video stream and that is sent by a camera to the first computing device may not include information about a position at which an event occurs. In this case, the information about the position at which the event occurs may be obtained by the first computing device. For example, the information that is about the first video stream and that is sent by the first camera to the first computing device may include information about a position at which the first event occurs, or may not include information about a position at which the first event occurs. If the information about the position at which the first event occurs is not included, the first computing device may determine the information about the position at which the first event occurs, and may add, to the information about the first video stream, the information about the position at which the first event occurs, to obtain updated information about the video stream.

In other words, if a camera can obtain information about a video stream through analysis, only a part of the information about the video stream may be obtained by the camera, and remaining information in the information about the video stream may be obtained by the first computing device. In this case, the information obtained by the camera and the information obtained by the first computing device may constitute the complete information about the video stream. Information sent by the first computing device to the server is also the complete information about the video stream.

S505: The first computing device sends the information about the first video stream to the server, and the server receives the information about the first video stream from the first computing device.

The first computing device sends the information about the one or more video streams to the server, and the server receives the information about the one or more video streams from the first computing device. In S505, the information about the first video stream is merely used as an example. If the first computing device sends only information about one video stream to the server, the information about the video stream is the information about the first video stream. Alternatively, if the first computing device sends information about a plurality of video streams to the server, the information about the first video stream may be one of the information about the plurality of video streams. The information about the one or more video streams may be used to select a video stream for a vehicle on a road, and the road may be a road on which the first event occurs.

For more implementation processes of S505, refer to the descriptions in S303 in the embodiment shown in FIG. 3.

S506: The server obtains the information about the first video stream and information about a second video stream, where information about each video stream includes evaluation information of the video stream and an address corresponding to the video stream, and the first video stream and the second video stream are video streams related to the first event.

For more implementation processes of S506, refer to the descriptions in S304 in the embodiment shown in FIG. 3.

S507: The server selects the first video stream for a first vehicle based on the information about the first video stream and the information about the second video stream.

For more implementation processes of S507, refer to the descriptions in S305 in the embodiment shown in FIG. 3.

S508: The server sends a first message to the first vehicle, where the first message includes the address corresponding to the first video stream. The first vehicle receives the first message from the server, and may obtain the address included in the first message.

It should be noted that, that the first message includes the address corresponding to the first video stream is merely an optional manner. In another implementation, the first message may alternatively not include the address corresponding to the first video stream. For example, as described above, the server may preconfigure the address corresponding to the video stream. In other words, the server may preconfigure a correspondence between a video stream and an address. If this manner is used, the server may send the configured correspondence between a video stream and an address to the first vehicle in advance. In this case, the server needs to send only the first message to the first vehicle, where the first message may be used to indicate the first video stream, or the first message may be used to indicate the first vehicle to request the first video stream. The first vehicle may learn of, based on the correspondence that is between a video stream and an address and that is configured by the server, the address corresponding to the first video stream. In this case, the first message in S306 may not include the address corresponding to the first video stream.

For more implementation processes of S508, refer to the descriptions in S306 in the embodiment shown in FIG. 3.

S509: The first vehicle sends a video request message to the first computing device, and the first computing device receives the video request message from the first vehicle. The video request message is used to request the first video stream in at least one video stream.

For more implementation processes of S509, refer to the descriptions in S307 in the embodiment shown in FIG. 3.

S510: The first computing device sends a third video stream to the first vehicle, and the first vehicle receives the third video stream from the first computing device.

For more implementation processes of S510, refer to the descriptions in S308 in the embodiment shown in FIG. 3.

According to the method provided in this embodiment of, the server may select the first video stream for the first vehicle. The first video stream may be a video stream selected after the evaluation information of the first video stream and evaluation information of the second video stream are analyzed. For example, the first video stream may be a video stream that has a highest score or a higher score in the at least one video stream and that is selected after the at least one video stream is evaluated by using a specific algorithm. In other words, the first video stream may be a video stream that better matches the first vehicle. In other words, by watching the first video stream, a passenger in the first vehicle can see relatively complete content about the first event. In this way, the server can match an appropriate video stream for the vehicle, and the vehicle does not need to autonomously select a video stream. This improves efficiency of obtaining a valuable video stream by the vehicle. In addition, the first vehicle can learn of a complete picture of the first event, and therefore the first vehicle can effectively avoid a pedestrian, another vehicle, or the like. This reduces a collision possibility, and improves driving safety. In addition, the camera may have a specific analysis function. This reduces a workload of the computing device. In this way, the computing device can process more video streams, and the server can obtain more diversified video streams. A selection range is expanded, and a video stream that is better matched can be selected for the vehicle.

Figure 6:
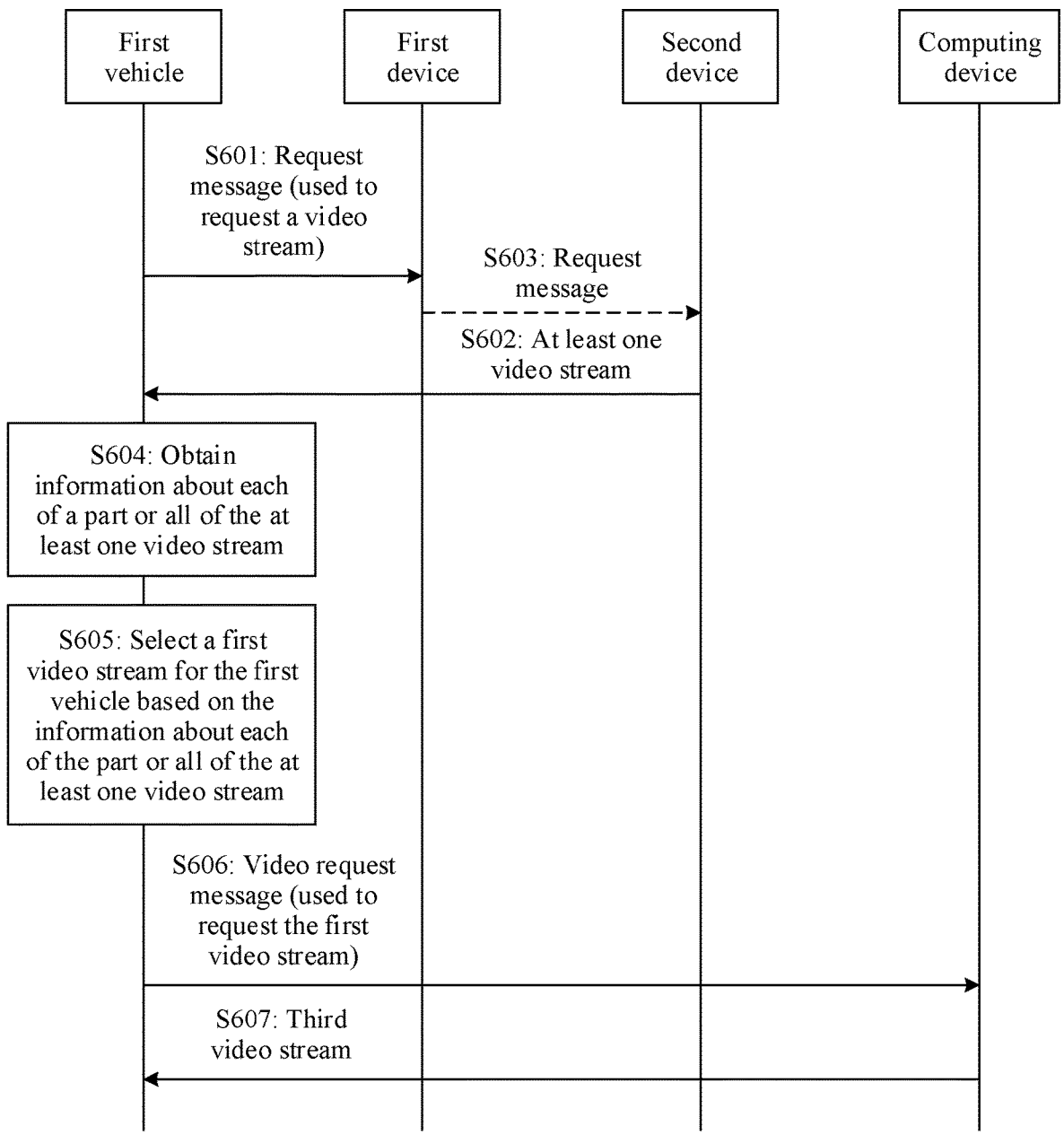
FIG. 6 is a flowchart of a third communication method according to an embodiment.

In the embodiment shown in FIG. 3 or the embodiment shown in FIG. 5, the server selects a video stream for the vehicle. In this mode, the workload of the server is heavy. However, the server usually needs to complete many functions. Therefore, in consideration of "reducing a workload" of the server, an embodiment further provides a third communication method. In this method, a vehicle may autonomously select a video stream. FIG. 6 is a flowchart of the method. The following provides a description by using an example in which the method is used in the system architecture shown in FIG. 2A or FIG. 2B.

For ease of description, that the method is performed by a computing device, a server, an image collection unit, and a vehicle is used as an example below. For example, the server is a V2X server, or may be another server. The image collection unit is, for example, a camera, or may be another apparatus used to collect an image. The following provides a description by using an example in which the image collection unit is a camera. The following operations performed by the vehicle are, for example, performed by an in-vehicle apparatus in the vehicle. In this embodiment, that the method is used in the network architecture shown in FIG. 2A or FIG. 2B is used as an example. Therefore, the computing device described below may be the computing device in the network architecture shown in FIG. 2A or FIG. 2B, the server described below may be the V2X server in the network architecture shown in FIG. 2A or FIG. 2B, and the camera described below may be the camera in the network architecture shown in FIG. 2A or FIG. 2B, and the vehicle described below may be the vehicle in the network architecture shown in FIG. 2A or FIG. 2B.

S601: A first vehicle sends a request message to a first device, and the first device receives the request message from the first vehicle. The request message is used to request to obtain at least one video stream collected by at least one camera.

The first device may be a computing device, or may be a server, for example, a V2X server.

S602: A second device sends at least one video stream to the first vehicle, and the first vehicle receives the at least one video stream from the second device. S602 may be considered as that the first vehicle obtains the at least one video stream.

The second device may be a computing device, may be a camera, or may be a server, for example, a V2X server.

The first device and the second device may be a same device. This is equivalent that the first device may send the at least one video stream to the first vehicle after receiving the request message. The camera may collect a video stream in real time, and may send the collected video stream to the computing device. If both the first device and the second device are a computing device, after receiving the request message, the computing device may send, to the first vehicle, the at least one video stream received from the at least one camera. In this case, the first vehicle obtains only a video stream collected by a camera corresponding to one computing device.

Alternatively, if both the first device and the second device are a server, after receiving the request message, the server may request to obtain a video stream from one or more computing devices. Each of the one or more computing devices may send a corresponding video stream to the server. The server obtains at least one video stream in total, and the server may send the at least one video stream to the first vehicle. Alternatively, one or more computing devices may send, to the server, a video stream received from a camera. For example, the one or more computing devices may send the video stream periodically or in real time. After receiving the request message, the server may directly send at least one video stream to the first vehicle. In this case, the first vehicle may obtain a video stream collected by a camera corresponding to one computing device, or may obtain video streams collected by cameras corresponding to a plurality of computing devices.

Alternatively, the first device and the second device may be different devices. For example, the first device is a computing device, and the second device is a server. This is equivalent that after receiving the request message, the computing device may forward the request message to the server. For a processing manner to be used after the server receives the request message, refer to the description in the foregoing paragraph. Because the first device and the second device may be different devices, FIG. 6 further includes S603: The first device may forward the request message to the second device, and the second device receives the request message from the first device. However, a line with an arrow in S603 is a dashed line, indicating that S603 is only an optional step. If the first device and the second device are the same device, S603 does not need to be performed.

S604: The first vehicle obtains information about each of a part or all of the at least one video stream.

After receiving the at least one video stream, the first vehicle may analyze the at least one video stream, to determine whether each of the at least one video stream is related to a first event. If a video stream is related to the first event, the first vehicle may obtain information about the video stream. If a video stream is unrelated to the first event, the first vehicle may not need to obtain information about the video stream. The first vehicle may finally obtain the information about each of the part or all of the at least one video stream, and each of the part or all of the video stream is a video stream related to the first event. The information about each video stream may include evaluation information of each video stream. Optionally, the information about each video stream may further include an address corresponding to the video stream. Alternatively, the server may also preconfigure a correspondence between a video stream and an address. In this case, the information about each video stream may not include the address corresponding to the video stream.

For more implementation details of S604, for example, content included in the evaluation information of the video stream, refer to the descriptions in S302 in the embodiment shown in FIG. 3.

S605: The first vehicle selects a first video stream for the first vehicle based on the information about the part or all of the at least one video stream.

For a manner in which the first vehicle selects the first video stream based on the information about the video stream, refer to the description of the manner in which the server selects the first video stream in S305 in the embodiment shown in FIG. 3.

S606: The first vehicle sends a video request message to the computing device, and the computing device receives the video request message from the first vehicle. The video request message is used to request the first video stream in the at least one video stream.

The first vehicle may obtain, by analyzing the first video stream, an address corresponding to the first video stream, or may determine, based on the correspondence that is between a video stream and an address and that is configured by the server, an address corresponding to the first video stream. The first vehicle may establish a connection with the computing device based on an address of the computing device that is included in the address corresponding to the first video stream, and send the video request message to the computing device through the established connection, to request to obtain the first video stream, in other words, request to obtain a video stream including content about the first event. The video request message may include a port number of the computing device. The port number is a port number included in the address corresponding to the first video stream.

Alternatively, because the first vehicle receives the at least one video stream from the second device, the first vehicle may directly send the video request message to the second device. The second device may be a first computing device, or may not be a first computing device, but may be, for example, a server. If the second device is the server, after receiving the video request message, the server may continue to request to obtain the video stream from a computing device corresponding to the first video stream.

S607: The computing device sends a third video stream to the first vehicle, and the first vehicle receives the third video stream from the computing device.

Alternatively, if the first vehicle sends the video request message to the second device, S607 may be that the second device sends a third video stream to the first vehicle, and the first vehicle receives the third video stream from the second device. Although the first vehicle has obtained the first video stream, the first video stream records information about a road in a previous time period. In the time period in which the first vehicle selects the video stream, a new change may occur on the road. To obtain a more real-time video stream, the first vehicle may request the video stream from the computing device. For example, if the camera collects a video stream in real time, after receiving the video request message from the first vehicle, the computing device may send, to the first vehicle, the third video stream that is collected in real time by the camera used to collect the first video stream, so that the first vehicle can learn of a latest road condition, and a passenger in the first vehicle can determine a current driving policy and the like based on the latest road condition. This reduces a probability of collision with another object, and improves driving safety.

For more implementation processes of S607, refer to the descriptions in S308 in the embodiment shown in FIG. 3.

According to the method provided in this embodiment, the first vehicle may autonomously select the first video stream. The first video stream may be a video stream selected after evaluation information of the first video stream and evaluation information of a second video stream are analyzed. For example, the first video stream may be a video stream that has a highest score or a higher score in the at least one video stream and that is selected after the at least one video stream is evaluated by using a specific algorithm. In other words, the first video stream may be a video stream that better matches the first vehicle. In other words, by watching the first video stream, the passenger in the first vehicle can see relatively complete content about the first event. In this way, the first vehicle can match an appropriate video stream for the first vehicle, and there is no need to manually select a video stream. Even if a relatively urgent case occurs, the vehicle can obtain a video stream in time because the first vehicle automatically selects the video stream without a need of a manual operation by a user. This improves efficiency of obtaining a valuable video stream by the vehicle. In addition, the first vehicle can learn of a complete picture of the first event, and therefore the first vehicle can effectively avoid a pedestrian, another vehicle, or the like. This reduces a collision possibility, and improves driving safety.

In the embodiments, a user may set whether to enable a function of selecting an optimal video stream. For example, the user may set the function by using a human-machine interaction interface of a vehicle. If the user enables the function of selecting an optimal video stream, a video stream may be selected for the vehicle by using the method provided in the embodiment shown in FIG. 3, the embodiment shown in FIG. 5, or the embodiment shown in FIG. 6. If the user chooses not to enable the function of selecting an optimal video stream, the solutions provided in this embodiment may not be used. In this way, when the methods provided in the embodiments are used can be flexibly controlled.

For example, when a vehicle travels on a road, an accident occurs on the road, and the vehicle is blocked by a front vehicle. As a result, a vehicle owner cannot clearly see what is going on in front of the vehicle. In this case, if the method provided in the embodiment shown in FIG. 3, the embodiment shown in FIG. 5, or the embodiment shown in FIG. 6 is used, the server may automatically select an optimal or better video stream for the vehicle, and the vehicle obtains the video stream. In this way, the vehicle owner of the vehicle can watch a specific situation of the accident, and can determine a corresponding measure.

The following describes, with reference to the accompanying drawings, apparatuses configured to implement the foregoing methods in the embodiments. Therefore, all the foregoing content may be used in subsequent embodiments, and repeated content is not described again.

Figure 7:
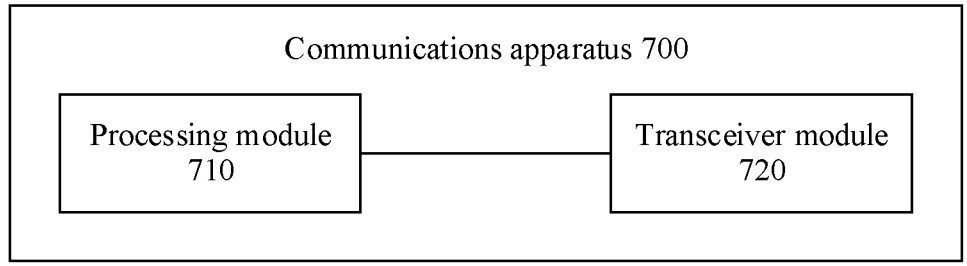
FIG. 7 is a schematic block diagram of a server according to an embodiment.

FIG. 7 is a schematic block diagram of a communications apparatus 700 according to an embodiment. The communications apparatus 700 may be a communications device, or an apparatus that can support a communications device to implement a function required for the method, for example, a chip system. For example, the communications device is an in-vehicle apparatus. For example, the communications device is, for example, a server. For example, the server is a V2X server.

The communications apparatus 700 includes a processing module 710 and a transceiver module 720. For example, the communications apparatus 700 may be a server, or may be a chip used in a server, or another combined device, another component, or the like that has a function of the server. When the communications apparatus 700 is the server, the transceiver module 720 may be a transceiver, and may include an antenna, a radio frequency circuit, and the like; and the processing module 710 may be a processor, for example, a baseband processor. The baseband processor may include one or more central processing units (CPUs). When the communications apparatus 700 is the component having a function of the server, the transceiver module 720 may be a radio frequency unit, and the processing module 710 may be a processor, for example, a baseband processor. When the communications apparatus 700 is the chip system, the transceiver module 720 may be an input/output interface of the chip system (for example, a baseband chip), and the processing module may be a processor of the chip system, and may include one or more central processing units.

The processing module 710 may be configured to perform all operations, except sending and receiving operations, performed by the server in the embodiment shown in FIG. 3, for example, S304 and S305, and/or configured to support another process of the technology described in this specification. The transceiver module 720 may be configured to perform all receiving and sending operations performed by the server in the embodiment shown in FIG. 3, for example, S303 and S306, and/or configured to support another process of the technology described in this specification.

Alternatively, the processing module 710 may be configured to perform all operations, except sending and receiving operations, performed by the server in the embodiment shown in FIG. 5, for example, S506 and S507, and/or configured to support another process of the technology described in this specification. The transceiver module 720 may be configured to perform all receiving and sending operations performed by the server in the embodiment shown in FIG. 5, for example, S505 and S508, and/or configured to support another process of the technology described in this specification.

In addition, the transceiver module 720 may be one functional module. The functional module can implement both a sending operation and a receiving operation. For example, the transceiver module 720 may be configured to perform all sending operations and receiving operations performed by the server in the embodiment shown in FIG. 3 or the embodiment shown in FIG. 5. For example, when a sending operation is performed, it may be considered that the transceiver module 720 is a sending module, and when a receiving operation is performed, it may be considered that the transceiver module 720 is a receiving module. Alternatively, the transceiver module 720 may be a general term of two functional modules. The two functional modules are a sending module and a receiving module. The sending module is configured to implement a sending operation. For example, the sending module may be configured to perform all sending operations performed by the server in the embodiment shown in FIG. 3 or the embodiment shown in FIG. 5. The receiving module is configured to implement a receiving operation. For example, the receiving module may be configured to perform all receiving operations performed by the server in the embodiment shown in FIG. 3 or the embodiment shown in FIG. 5.

For example, the processing module 710 is configured to obtain information about a first video stream and information about a second video stream, where information about each video stream includes evaluation information of the video stream and an address corresponding to the video stream, and the first video stream and the second video stream are video streams related to a first event.

The processing module 710 is further configured to select the first video stream for a first vehicle based on evaluation information of the first video stream and evaluation information of the second video stream.

The transceiver module 720 is configured to send a first message to the first vehicle, where the first message includes an address corresponding to the first video stream.

In an optional implementation, the evaluation information of each video stream includes evaluation information of an image in the video stream, and the evaluation information of the image includes one or more of the following: integrity of the image, where the integrity of the image is a ratio of an area of an event detection region to an area of an ROI region in the image; a deviation degree of the image, where the deviation degree of the image is a deviation degree of a geometric center of the event detection region in the image relative to a center position of the image; and resolution of the image.

In an optional implementation, the evaluation information of the image in the video stream includes evaluation information of at least one frame of image in the video stream.

In an optional implementation, the information about each video stream further includes information about the first event, and the information about the first event includes one or more of the following information: type information of the first event, an identifier of the first event, information about a position at which the first event occurs, and information about a time at which the first event occurs.

In an optional implementation, the processing module 710 is further configured to determine an evaluation score of each video stream based on the evaluation information of the video stream. The evaluation score of each video stream is determined based on the evaluation information of the image in the video stream.

In an optional implementation, the information about each video stream further includes an identifier of an image collection unit that collects the video stream, and the processing module 710 is further configured to: obtain information about a position and field of view of each image collection unit based on an identifier of the image collection unit; and determine a matching degree between each video stream and the first vehicle based on at least one of driving route information of the first vehicle and lane information of the first vehicle and based on the information about the position and field of view of each image collection unit.

In an optional implementation, the processing module 710 is configured to determine the evaluation score of each video stream based on the evaluation information of the first video stream and the evaluation information of the second video stream in the following manner: determining an evaluation score of the first video stream based on the evaluation information of the first video stream and a matching degree between the first video stream and the first vehicle; and determining an evaluation score of the second video stream based on the evaluation information of the second video stream and a matching degree between the second video stream and the first vehicle.

In an optional implementation, the processing module 710 is configured to select the first video stream for the first vehicle based on the evaluation information of the first video stream and the evaluation information of the second video stream in the following manner: selecting the first video stream for the first vehicle based on the evaluation score of the first video stream and the evaluation score of the second video stream.

In an optional implementation, the evaluation score of the first video stream is higher than the evaluation score of the second video stream.

In an optional implementation, the first message further includes one or more of the following: the information about the position at which the first event occurs, the type information of the first event, the information about the time at which the first event occurs, and information about a road on which the first vehicle is located.

In an optional implementation, the processing module 710 is configured to obtain the information about the first video stream and the information about the second video stream in the following manner: obtaining, through the transceiver module 720, the information about the first video stream from a first computing device and the information about the second video stream from a second computing device, where the address corresponding to the first video stream is an address that is provided by the first computing device and that is used to obtain the first video stream, and an address corresponding to the second video stream is an address that is provided by the second computing device and that is used to obtain the second video stream.

In an optional implementation, the first computing device and the second computing device are a same computing device.

It should be understood that the processing module 710 in this embodiment may be implemented by a processor or a processor-related circuit component, and the transceiver module 720 may be implemented by a transceiver or a transceiver-related circuit component.

Figure 8:
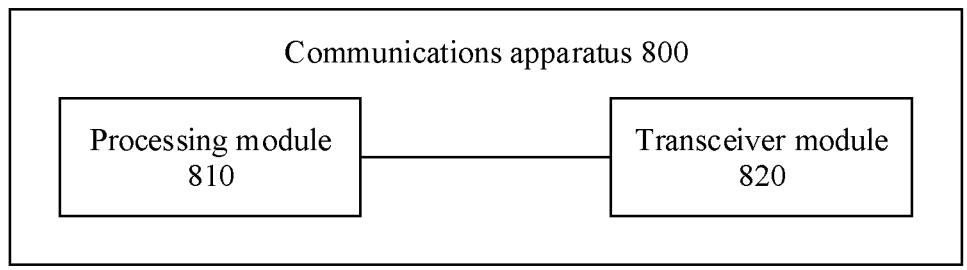
FIG. 8 is a schematic block diagram of a computing device according to an embodiment.

FIG. 8 is a schematic block diagram of a communications apparatus 800 according to an embodiment. The communications apparatus 800 may be a communications device, or an apparatus that can support a communications device to implement a function required for the method, for example, a chip system. For example, the communications device is a first computing device. For example, the first computing device is, for example, an intelligent transportation edge 800.

The communications apparatus 800 includes a processing module 810 and a transceiver module 820. For example, the communications apparatus 800 may be a computing device, or may be a chip used in a computing device, or another combined device, another component, or the like that has a function of the computing device. For example, the computing device is, for example, the first computing device. When the communications apparatus 800 is the computing device, the transceiver module 820 may be a transceiver, and may include an antenna, a radio frequency circuit, and the like; and the processing module 810 may be a processor, for example, a baseband processor. The baseband processor may include one or more CPUs. When the communications apparatus 800 is the component having a function of the first computing device, the transceiver module 820 may be a radio frequency unit, and the processing module 810 may be a processor, for example, a baseband processor. When the communications apparatus 800 is the chip system, the transceiver module 820 may be an input/output interface of the chip system (for example, a baseband chip), and the processing module may be a processor of the chip system, and may include one or more central processing units.

The processing module 810 may be configured to perform all operations, except sending and receiving operations, performed by the first computing device in the embodiment shown in FIG. 3, for example, S302, and/or configured to support another process of the technology described in this specification. The transceiver module 820 may be configured to perform all receiving and sending operations performed by the first computing device in the embodiment shown in FIG. 3, for example, S301, S303, S307, and S308, and/or configured to support another process of the technology described in this specification.

Alternatively, the processing module 810 may be configured to perform all operations, except sending and receiving operations, performed by the first computing device in the embodiment shown in FIG. 5, for example, S504, and/or configured to support another process of the technology described in this specification. The transceiver module 820 may be configured to perform all receiving and sending operations performed by the first computing device in the embodiment shown in FIG. 5, for example, S503, S505, S509, and S510, and/or configured to support another process of the technology described in this specification.

In addition, the transceiver module 820 may be one functional module. The functional module can implement both a sending operation and a receiving operation. For example, the transceiver module 820 may be configured to perform all sending operations and receiving operations performed by the first computing device in the embodiment shown in FIG. 3 or the embodiment shown in FIG. 5. For example, when a sending operation is performed, it may be considered that the transceiver module 820 is a sending module, and when a receiving operation is performed, it may be considered that the transceiver module 820 is a receiving module. Alternatively, the transceiver module 820 may be a general term of two functional modules. The two functional modules are a sending module and a receiving module. The sending module is configured to implement a sending operation. For example, the sending module may be configured to perform all sending operations performed by the first computing device in the embodiment shown in FIG. 3 or the embodiment shown in FIG. 5. The receiving module is configured to implement a receiving operation. For example, the receiving module may be configured to perform all receiving operations performed by the first computing device in the embodiment shown in FIG. 3 or the embodiment shown in FIG. 5.

For example, the transceiver module 820 is configured to communicate with one or more image collection units, and receive a video stream collected by each image collection unit.

The processing module 810 is configured to determine a first video stream from the received video stream, and obtain information about the first video stream, where the first video stream is a video stream related to a first event.

The transceiver module 820 is further configured to send the information about the first video stream to a server, where the information about the first video stream includes evaluation information of the first video stream and an address corresponding to the first video stream.

In an optional implementation, the evaluation information of the first video stream includes evaluation information of an image in the first video stream, and the evaluation information of the image includes one or more of the following: integrity of the image, where the integrity of the image is a ratio of an area of an event detection region to an area of an ROI region in the image; a deviation degree of the image, where the deviation degree of the image is a deviation degree of a geometric center of the event detection region in the image relative to a center position of the image; and resolution of the image.

In an optional implementation, the evaluation information of the image in the first video stream includes evaluation information of at least one frame of image in the first video stream.

In an optional implementation, the processing module 810 is configured to determine the first video stream from the received video stream and obtain the information about the first video stream in the following manner: analyzing the received video stream collected by each image collection unit, determining the first video stream related to the first event, and obtaining the information about the first video stream.

In an optional implementation, the information about the first video stream further includes information about the first event, and the information about the first event includes one or more of the following: type information of the first event, an identifier of the first event, information about a position at which the first event occurs, and information about a time at which the first event occurs.

In an optional implementation, the processing module 810 is configured to determine the first video stream from the received video stream and obtain the information about the first video stream in the following manner: receiving, through the transceiver module 820, an event detection message from a first image collection unit in the one or more image collection units, where the event detection message is used to indicate that the first image collection unit detects the first event in a video stream collected by the first image collection unit, and the event detection message includes information about the video stream collected by the first image collection unit; and determining that the video stream collected by the first image collection unit is the first video stream, and obtaining the information about the first video stream.

In an optional implementation, the information about the first video stream further includes information about the first event, and the information about the first event includes one or more of the following: type information of the first event, an identifier of the first event, information about a position at which the first event occurs, and information about a time at which the first event occurs.

In an optional implementation, the address corresponding to the first video stream is an address from which the first video stream can be obtained.

In an optional implementation, the transceiver module 820 is further configured to receive a video request message from a first vehicle, where the video request message includes the address corresponding to the first video stream; the processing module 810 is further configured to determine, based on the address, the first video stream and the first image collection unit corresponding to the first video stream; and the transceiver module 820 is further configured to send, to the first vehicle, the video stream collected by the first image collection unit.

It should be understood that the processing module 810 in this embodiment may be implemented by a processor or a processor-related circuit component, and the transceiver module 820 may be implemented by a transceiver or a transceiver-related circuit component.

Figure 9:
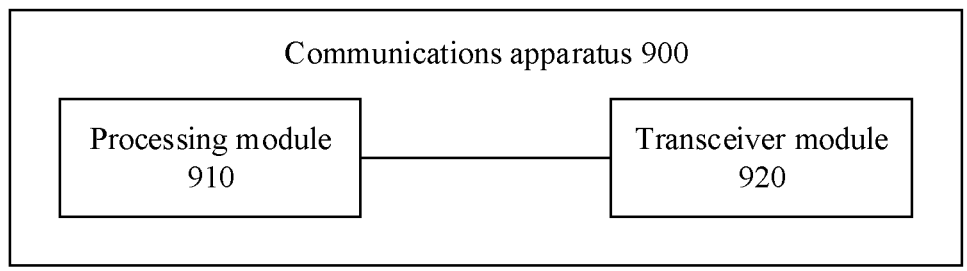
FIG. 9 is a schematic block diagram of an image collection unit according to an embodiment.

FIG. 9 is a schematic block diagram of a communications apparatus 900 according to an embodiment. The communications apparatus 900 may be a communications device, or an apparatus that can support a communications device to implement a function required for the method, for example, a chip system. For example, the communications device is an image collection unit. For example, the image collection unit is, for example, a camera 900.

The communications apparatus 900 includes a processing module 910 and a transceiver module 920. For example, the communications apparatus 900 may be an image collection unit, or may be a chip used in an image collection unit, or another combined device, another component, or the like that has a function of the image collection unit. When the communications apparatus 900 is the image collection unit, the transceiver module 920 may be a transceiver, and may include an antenna, a radio frequency circuit, and the like; and the processing module 910 may be a processor, for example, a baseband processor. The baseband processor may include one or more CPUs. When the communications apparatus 900 is the component having a function of the image collection unit, the transceiver module 920 may be a radio frequency unit, and the processing module 910 may be a processor, for example, a baseband processor. When the communications apparatus 900 is the chip system, the transceiver module 920 may be an input/output interface of the chip system (for example, a baseband chip), and the processing module may be a processor of the chip system, and may include one or more central processing units.

The processing module 910 may be configured to perform all operations, except sending and receiving operations, performed by the image collection unit in the embodiment shown in FIG. 5, for example, S501 and S502, and/or configured to support another process of the technology described in this specification. The transceiver module 920 may be configured to perform all receiving and sending operations performed by the image collection unit in the embodiment shown in FIG. 5, for example, S503, and/or configured to support another process of the technology described in this specification.

In addition, the transceiver module 920 may be one functional module. The functional module can implement both a sending operation and a receiving operation. For example, the transceiver module 920 may be configured to perform all sending operations and receiving operations performed by the image collection unit in the embodiment shown in FIG. 5. For example, when a sending operation is performed, it may be considered that the transceiver module 920 is a sending module, and when a receiving operation is performed, it may be considered that the transceiver module 920 is a receiving module. Alternatively, the transceiver module 920 may be a general term of two functional modules. The two functional modules are a sending module and a receiving module. The sending module is configured to implement a sending operation. For example, the sending module may be configured to perform all sending operations performed by the image collection unit in the embodiment shown in FIG. 5. The receiving module is configured to implement a receiving operation. For example, the receiving module may be configured to perform all receiving operations performed by the image collection unit in the embodiment shown in FIG. 5.

For example, the processing module 910 is configured to collect a first video stream.

The processing module 910 is further configured to determine that the first video stream is a video stream related to a first event.

The transceiver module 920 is configured to send the first video stream to a computing device.

In an optional implementation, the processing module 910 is further configured to analyze the first video stream to obtain information about the first video stream; and the transceiver module 920 is further configured to send the information about the first video stream to the computing device, where the information about the first video stream includes evaluation information of the first video stream.

In an optional implementation, the evaluation information of the first video stream includes evaluation information of an image in the first video stream, and the evaluation information of the image includes one or more of the following: integrity of the image, where the integrity of the image is a ratio of an area of an event detection region to an area of an ROI region in the image; a deviation degree of the image, where the deviation degree of the image is a deviation degree of a geometric center of an event detection region in the image relative to a center position of the image; and resolution of the image.

In an optional implementation, the evaluation information of the image in the first video stream includes evaluation information of at least one frame of image in the first video stream.

In an optional implementation, the information about the first video stream further includes information about the first event, and the information about the first event includes one or more of the following: type information of the first event, an identifier of the first event, information about a position at which the first event occurs, and information about a time at which the first event occurs.

It should be understood that the processing module 910 in this embodiment may be implemented by a processor or a processor-related circuit component, and the transceiver module 920 may be implemented by a transceiver or a transceiver-related circuit component.

Figure 10:
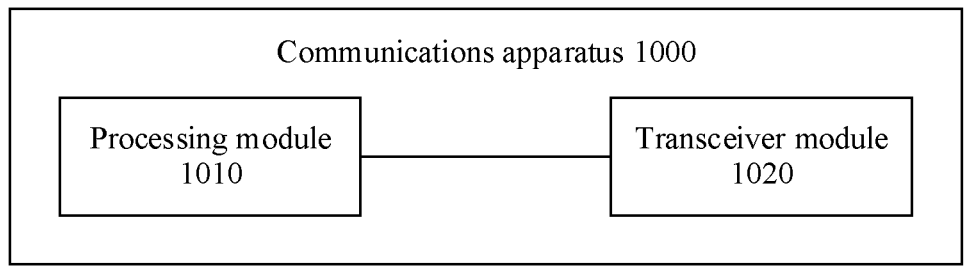
FIG. 10 is a schematic block diagram of a first vehicle according to an embodiment.

FIG. 10 is a schematic block diagram of a communications apparatus 1000 according to an embodiment. The communications apparatus 1000 may be a communications device, or an apparatus that can support a communications device to implement a function required for the method, for example, a chip system. For example, the communications device is a vehicle. For example, the vehicle is a first vehicle 1000. For example, the first vehicle 1000 is, for example, an entire vehicle, or an in-vehicle apparatus disposed in a vehicle.

The communications apparatus 1000 includes a processing module 1010 and a transceiver module 1020. For example, the communications apparatus 1000 may be a vehicle, for example, the first vehicle, or may be a chip used in a vehicle, or another combined device, another component, or the like that has a function of the first vehicle. When the communications apparatus 1000 is the first vehicle, the transceiver module 1020 may be a transceiver, and may include an antenna, a radio frequency circuit, and the like; and the processing module 1010 may be a processor, for example, a baseband processor. The baseband processor may include one or more CPUs. When the communications apparatus 1000 is the component having a function of the first vehicle, the transceiver module 1020 may be a radio frequency unit, and the processing module 1010 may be a processor, for example, a baseband processor. When the communications apparatus 1000 is the chip system, the transceiver module 1020 may be an input/output interface of the chip system (for example, a baseband chip), and the processing module may be a processor of the chip system, and may include one or more central processing units.

The processing module 1010 may be configured to perform all operations, except sending and receiving operations, performed by the first vehicle in the embodiment shown in FIG. 6, for example, S604 and S605, and/or configured to support another process of the technology described in this specification. The transceiver module 1020 may be configured to perform all receiving and sending operations performed by the first vehicle in the embodiment shown in FIG. 6, for example, S601, S602, S606, and S607, and/or configured to support another process of the technology described in this specification.

In addition, the transceiver module 1020 may be one functional module. The functional module can implement both a sending operation and a receiving operation. For example, the transceiver module 1020 may be configured to perform all sending operations and receiving operations performed by the first vehicle in the embodiment shown in FIG. 6. For example, when a sending operation is performed, it may be considered that the transceiver module 1020 is a sending module, and when a receiving operation is performed, it may be considered that the transceiver module 1020 is a receiving module. Alternatively, the transceiver module 1020 may be a general term of two functional modules. The two functional modules are a sending module and a receiving module. The sending module is configured to implement a sending operation. For example, the sending module may be configured to perform all sending operations performed by the first vehicle in the embodiment shown in FIG. 6. The receiving module is configured to implement a receiving operation. For example, the receiving module may be configured to perform all receiving operations performed by the first vehicle in the embodiment shown in FIG. 6.

For example, the transceiver module 1020 is configured to receive at least one video stream.

The processing module 1010 is configured to obtain information about a part or all of the at least one video stream, where information about each video stream includes evaluation information of the video stream.

The processing module 1010 is configured to select a first video stream from the at least one video stream for the communications apparatus 1000 based on the information about the part or all of the at least one video stream.

In an optional implementation, the evaluation information of each video stream includes evaluation information of an image in the video stream, and the evaluation information of the image includes one or more of the following: integrity of the image, where the integrity of the image is a ratio of an area of an event detection region to an area of an ROI region in the image; a deviation degree of the image, where the deviation degree of the image is a deviation degree of a geometric center of the event detection region in the image relative to a center position of the image; and resolution of the image.

In an optional implementation, the evaluation information of the image in the video stream includes evaluation information of at least one frame of image in the video stream.

In an optional implementation, the information about each video stream further includes information about the first event, and the information about the first event includes one or more of the following information: type information of the first event, an identifier of the first event, information about a position at which the first event occurs, and information about a time at which the first event occurs.

In an optional implementation, the processing module 1010 is further configured to determine an evaluation score of each video stream based on the evaluation information of the video stream. The evaluation score of each video stream is determined based on the evaluation information of the image in the video stream.

In an optional implementation, the information about each video stream further includes an identifier of an image collection unit that collects the video stream, and the processing module 1010 is further configured to: obtain information about a position and field of view of each image collection unit based on an identifier of the image collection unit; and determine a matching degree between each video stream and the first vehicle based on at least one of driving route information of the first vehicle and lane information of the first vehicle and based on the information about the position and field of view of each image collection unit.

In an optional implementation, the processing module 1010 is configured to determine the evaluation score of each video stream based on the evaluation information of the part or all of the at least one video stream in the following manner: determining the evaluation score of each video stream based on the evaluation information of each of the part or all of the at least one video stream and the matching degree between each video stream and the first vehicle.

In an optional implementation, the processing module 1010 is configured to select the first video stream for the first vehicle based on evaluation information of the at least one video stream in the following manner: selecting the first video stream for the first vehicle based on an evaluation score of the at least one video stream.

In an optional implementation, an evaluation score of the first video stream is higher than an evaluation score of another video stream in the at least one video stream.

In an optional implementation, the first message further includes one or more of the following: the information about the position at which the first event occurs, the type information of the first event, the information about the time at which the first event occurs, and information about a road on which the first vehicle is located.

An embodiment further provides an apparatus 1100. The apparatus 1100 includes at least one processor 1101, a communications bus 1102, a memory 1103, and at least one communications interface 1104. The apparatus 1100 may be a general-purpose computer or server, or a dedicated computer or server. The apparatus 1100 may be configured to perform an action performed by the server in the method embodiment shown in FIG. 3 or the method embodiment shown in FIG. 5. Alternatively, the apparatus 1100 may be configured to perform an action performed by the computing device (for example, the first computing device) in the method embodiment shown in FIG. 3 or the method embodiment shown in FIG. 5. Alternatively, the apparatus 1100 may be configured to perform an action performed by the image collection unit (for example, a camera) in the method embodiment shown in FIG. 5. Alternatively, the apparatus 1100 may be configured to perform an action performed by the first vehicle in the method embodiment shown in FIG. 6.

The processor 1101 may be a general-purpose CPU, a microprocessor, an application-specific integrated circuit (ASIC), or one or more integrated circuits configured to control program execution in the solutions. For example, the processor 1101 may implement a function of the processing module 710 in the communications apparatus 700 shown in FIG. 7. Alternatively, the processor 1101 may implement a function of the processing module 810 in the communications apparatus 800 shown in FIG. 8. Alternatively, the processor 1101 may implement a function of the processing module 910 in the communications apparatus 900 shown in FIG. 9. Alternatively, the processor 1101 may implement a function of the processing module 1010 in the communications apparatus 1000 shown in FIG. 10.

The communications bus 1102 may include a path for transferring information between the foregoing components.

The communications interface 1104 may be any transceiver, any IP port, any bus interface, or the like, and is configured to communicate with an internal or external device, an apparatus, or a communications network, for example, the Ethernet, a radio access network (RAN), or a wireless local area network (WLAN). For example, when the apparatus 1100 is a functional unit integrated in a vehicle, the communications interface 1104 includes one or more of the following interfaces, for example, a transceiver for communication between the vehicle and an external network, and a bus interface (for example, a controller area network (CAN) bus interface) for communication between the vehicle and another internal unit of the vehicle. For example, the communications interface 1104 may implement a function of the transceiver module 720 in the communications apparatus 700 shown in FIG. 7. Alternatively, the communications interface 1104 may implement a function of the transceiver module 820 in the communications apparatus 800 shown in FIG. 8. Alternatively, the communications interface 1104 may implement a function of the transceiver module 920 in the communications apparatus 900 shown in FIG. 9. Alternatively, the communications interface 1104 may implement a function of the transceiver module 1020 in the communications apparatus 1000 shown in FIG. 10.

The memory 1103 may be a read-only memory (ROM) or another type of static storage device capable of storing static information and instructions, or a random-access memory (RAM) or another type of dynamic storage device capable of storing information and instructions, or may be an electrically erasable programmable ROM (EEPROM), a compact disc ROM (CD-ROM) or another compact disc storage, optical disc storage (including a compressed optical disc, a laser disc, an optical disc, a digital versatile optical disc, a blue-ray optical disc, or the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor through the bus. Alternatively, the memory may be integrated with the processor.

The memory 1103 is configured to store application program code for executing the solutions, and the processor 1101 controls the execution. The processor 1101 is configured to execute the application program code stored in the memory 1103, to implement a function of the server, the first computing device, the image collection unit, or the first vehicle in the methods provided in the embodiments.

In a specific implementation, in an embodiment, the processor 1101 may include one or more CPUs, for example, a CPU 0 and a CPU 1 in FIG. 11.

In a specific implementation, in an embodiment, the apparatus 1100 may include a plurality of processors, for example, the processor 1101 and a processor 1108 in FIG. 11. Each of the processors may be a single-core (single-CPU) processor or a multi-core (multi-CPU) processor. The processor herein may refer to one or more devices, circuits, and/or processing cores configured to process data (for example, a computer program instruction).

In a specific implementation, in an embodiment, the apparatus 1000 may further include an output device 1105 and an input device 1106. The output device 1105 communicates with the processor 1101, and may display information in a plurality of manners. For example, the output device 1105 may be a liquid-crystal display (LCD), a light-emitting diode (LED) display device, a cathode-ray tube (CRT) display device, or a projector. The input device 1106 communicates with the processor 1101, and may receive an input of a user in a plurality of manners. For example, the input device 1106 may be a mouse, a keyboard, a touchscreen device, or a sensing device.

When the apparatus shown in FIG. 11 is a chip, a function/implementation process of the communications interface 1104 may alternatively be implemented by using a pin, a circuit, or the like, and the memory is a storage unit in the chip, for example, a register or a cache. The storage unit may alternatively be a storage unit outside the chip.

An embodiment provides a communications system. The communications system may include the server in the embodiment shown in FIG. 3 or the embodiment shown in FIG. 5. The server is, for example, the communications apparatus 700 in FIG. 7 or the apparatus 1100 in FIG. 11. For example, the server may be configured to perform all operations performed by the server in the embodiment shown in FIG. 3 or the embodiment shown in FIG. 5. For example, the server may be configured to perform S303 to S306 in the embodiment shown in FIG. 3, and/or configured to support another process of the technology described in this specification; or the server may be configured to perform S505 to S508 in the embodiment shown in FIG. 5, and/or configured to support another process of the technology described in this specification.

In an optional implementation, the communications system may further include at least one of the computing device in the embodiment shown in FIG. 3 or the embodiment shown in FIG. 5. The computing device is, for example, the communications apparatus 800 in FIG. 8 or the apparatus 1100 in FIG. 11. For example, the computing device may be configured to perform all operations performed by the first computing device in the embodiment shown in FIG. 3 or the embodiment shown in FIG. 5. For example, the computing device may be configured to perform S301 to S303, S307, and S308 in the embodiment shown in FIG. 3, and/or configured to support another process of the technology described in this specification; or the computing device may be configured to perform S503 to S505, S509, and S510 in the embodiment shown in FIG. 5, and/or configured to support another process of the technology described in this specification.

An embodiment provides a communications system. The communications system may include at least one of the image collection unit in the embodiment shown in FIG. 5. The image collection unit is, for example, the communications apparatus 900 in FIG. 9 or the apparatus 1100 in FIG. 11. For example, the image collection unit may be configured to perform all operations performed by the image collection unit in the embodiment shown in FIG. 5, for example, S501 to S503 in the embodiment shown in FIG. 5, and/or configured to support another process of the technology described in this specification.

In an optional implementation, the communications system may further include the server in the embodiment shown in FIG. 3 or the embodiment shown in FIG. 5. The server is, for example, the communications apparatus 700 in FIG. 7 or the apparatus 1100 in FIG. 11. For example, the server may be configured to perform all operations performed by the server in the embodiment shown in FIG. 3 or the embodiment shown in FIG. 5. For example, the server may be configured to perform S303 to S306 in the embodiment shown in FIG. 3, and/or configured to support another process of the technology described in this specification; or the server may be configured to perform S505 to S508 in the embodiment shown in FIG. 5, and/or configured to support another process of the technology described in this specification.

In an optional implementation, the communications system may further include at least one of the computing device in the embodiment shown in FIG. 3 or the embodiment shown in FIG. 5. The computing device is, for example, the communications apparatus 800 in FIG. 8 or the apparatus 1100 in FIG. 11. For example, the computing device may be configured to perform all operations performed by the first computing device in the embodiment shown in FIG. 3 or the embodiment shown in FIG. 5. For example, the computing device may be configured to perform S301 to S303, S307, and S308 in the embodiment shown in FIG. 3, and/or configured to support another process of the technology described in this specification; or the computing device may be configured to perform S503 to S505, S509, and S510 in the embodiment shown in FIG. 5, and/or configured to support another process of the technology described in this specification.

An embodiment provides a communications system. The communications system may include the first vehicle in the embodiment shown in FIG. 6. The first vehicle is, for example, the communications apparatus 1000 in FIG. 10 or the apparatus 1100 in FIG. 11. For example, the first vehicle may be configured to perform all operations performed by the first vehicle in the embodiment shown in FIG. 6, for example, S601, S602, and S604 to S607 in the embodiment shown in FIG. 6, and/or configured to support another process of the technology described in this specification.

An embodiment further provides a computer-readable storage medium. The computer-readable storage medium is configured to store a computer program. When the computer program is executed by a computer, the computer may implement a server-related procedure provided in the method embodiment shown in FIG. 3.

An embodiment further provides a computer-readable storage medium. The computer-readable storage medium stores a computer program. When the computer program is executed by a computer, the computer may implement a server-related procedure provided in the method embodiment shown in FIG. 5.

An embodiment further provides a computer-readable storage medium. The computer-readable storage medium stores a computer program. When the computer program is executed by a computer, the computer may implement a computing device (for example, the first computing device) related procedure provided in the method embodiment shown in FIG. 3.

An embodiment further provides a computer-readable storage medium. The computer-readable storage medium stores a computer program. When the computer program is executed by a computer, the computer may implement a computing device (for example, the first computing device) related procedure provided in the method embodiment shown in FIG. 5.

An embodiment further provides a computer-readable storage medium. The computer-readable storage medium stores a computer program. When the computer program is executed by a computer, the computer may implement an image collection unit related procedure provided in the method embodiment shown in FIG. 5.

An embodiment further provides a computer-readable storage medium. The computer-readable storage medium stores a computer program. When the computer program is executed by a computer, the computer may implement a first vehicle related procedure provided in the method embodiment shown in FIG. 6.

An embodiment further provides a computer program product. The computer program product is configured to store a computer program. When the computer program is executed by a computer, the computer may implement a server-related procedure provided in the method embodiment shown in FIG. 3.

An embodiment further provides a computer program product. The computer program product is configured to store a computer program. When the computer program is executed by a computer, the computer may implement a server-related procedure provided in the method embodiment shown in FIG. 5.

An embodiment further provides a computer program product. The computer program product is configured to store a computer program. When the computer program is executed by a computer, the computer may implement a computing device (for example, the first computing device) related procedure provided in the method embodiment shown in FIG. 3.

An embodiment further provides a computer program product. The computer program product is configured to store a computer program. When the computer program is executed by a computer, the computer may implement a computing device (for example, the first computing device) related procedure provided in the method embodiment shown in FIG. 5.

An embodiment further provides a computer program product. The computer program product is configured to store a computer program. When the computer program is executed by a computer, the computer may implement an image collection unit related procedure provided in the method embodiment shown in FIG. 5.

An embodiment further provides a computer program product. The computer program product is configured to store a computer program. When the computer program is executed by a computer, the computer may implement a first vehicle related procedure provided in the method embodiment shown in FIG. 6.

It should be understood that the processor in the embodiments may be a CPU, or may be another general-purpose processor, a digital signal processor (DSP), an ASIC, a field-programmable gate array (FPGA), or another programmable logic device, discrete gate or transistor logic device, discrete hardware component, or the like. The general-purpose processor may be a microprocessor, or the processor may be any conventional processor or the like.

It may be understood that the memory in the embodiments may be a volatile memory, or a nonvolatile memory, or may include both a volatile memory and a nonvolatile memory. The nonvolatile memory may be a ROM, a programmable ROM (PROM), an erasable programmable ROM (EPROM), an EEPROM, or a flash memory. The volatile memory may be a RAM and is used as an external cache. Through example but not limitative description, RAMs in many forms may be, for example, a static RAM (SRAM), a dynamic RAM (DRAM), a synchronous DRAM (SDRAM), a double data rate SDRAM (DDR SDRAM), an enhanced SDRAM (ESDRAM), a SyncLink DRAM (SLDRAM), and a direct Rambus RAM (DR RAM).

It should be noted that when the processor is a general-purpose processor, a DSP, an ASIC, an FPGA, or another programmable logic device, a discrete gate or a transistor logic device, or discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in the embodiments. The execution sequences of the processes should be determined based on functions and internal logic of the processes, and should not be construed as any limitation to the implementation processes of the embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided, it should be understood that the disclosed system, apparatus, and method may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments. The foregoing storage medium includes: any medium that can store program code, such as a universal serial bus flash drive (Universal Serial Bus (USB) flash disk), a removable hard disk, a ROM, a RAM, a magnetic disk, or an optical disc.

The foregoing descriptions are merely specific implementations, but are not intended to limit the protection scope of the embodiments. Any variation or replacement readily figured out by a person skilled in the art within the technical scope disclosed in the embodiments shall fall within the protection scope of the embodiments. Therefore, the protection scope of the embodiments shall be subject to the protection scope of the claims.

What is claimed is:

1. A communication method comprising:
   obtaining first information about a first video stream related to an event, wherein the first information comprises first evaluation information of the first video stream and a first address corresponding to the first video stream, wherein the first evaluation information comprises one or more of an integrity, a deviation degree, or a resolution;
   obtaining second information about a second video stream related to the event, wherein the second information comprises second evaluation information of the second video stream and a second address corresponding to the second video stream;
   making a selection of the first video stream for a vehicle based on the first evaluation information and the second evaluation information; and
   sending, to the vehicle, a first message comprising the first address.

2. The communication method of claim 1, wherein the first evaluation information is of an image in the first video stream, wherein the integrity, the deviation degree, or the resolution is of the image, wherein the integrity is a ratio of a first area of an event detection region to a second area of a region of interest (ROI) in the image, and wherein the deviation degree represents a deviation of a geometric center of the event detection region from a center position of the image.

3. The communication method of claim 2, wherein the first evaluation information is further of a frame of the image.

4. The communication method of claim 2, wherein the first evaluation information further comprises an identifier of an image collection unit that collects the first video stream, and wherein the communication method further comprises:
   obtaining information about a position and a field of view of the image collection unit based on the identifier; and
   determining a matching degree between the first video stream and the vehicle based on driving route information of the vehicle or lane information of the vehicle and based on the information.

5. The communication method of claim 1, further comprising:
   determining a first evaluation score of the first video stream based on the first evaluation information; and
   determining a second evaluation score of the second video stream based on the second evaluation information.

6. The communication method of claim 5, further comprising:
   further determining the first evaluation score based on a first matching degree between the first video stream and the vehicle; and
   further determining the second evaluation score based on a second matching degree between the second video stream and the vehicle.

7. The communication method of claim 1, wherein the first message further comprises information about a position at which the event occurred, a type of the event, a time at which the event occurred, or a road on which the vehicle was located when the event occurred.

8. The communication method of claim 1, wherein the first address comprises an address of a computing device corresponding to the first video stream and comprises a port number of the computing device, wherein the port number is of a port through which the computing device receives the first video stream.

9. The communication method of claim 1, further comprising further sending the first message in response to the selection.

10. A communication method comprising:
    obtaining first information about a first video stream related to an event, wherein the first information comprises first evaluation information of the first video stream and a first address corresponding to the first video stream;
    obtaining second information about a second video stream related to the event, wherein the second information comprises second evaluation information of the second video stream and a second address corresponding to the second video stream;
    selecting the first video stream for a vehicle based on the first evaluation information and the second evaluation information; and
    sending, to the vehicle, a first message comprising the first address and information about a position at which the event occurred, a type of the event, a time at which the event occurred, or a road on which the vehicle was located when the event occurred.

11. The communication method of claim 10, wherein the first evaluation information is of an image in the first video stream, wherein the first evaluation information comprises an integrity, a deviation degree, or a resolution of the image, wherein the integrity is a ratio of a first area of an event detection region to a second area of a region of interest (ROI) in the image, and wherein the deviation degree represents a deviation of a geometric center of the event detection region from a center position of the image.

12. The communication method of claim 11, wherein the first evaluation information is further of a frame of the image.

13. The communication method of claim 10, further comprising:
    determining a first evaluation score of the first video stream based on the first evaluation information; and
    determining a second evaluation score of the second video stream based on the second evaluation information.

14. A communications apparatus comprising:
    a communications interface; and
    one or more processors coupled to the communications interface and configured to:
        obtain first information about a first video stream related to an event, wherein the first information comprises first evaluation information of the first video stream and a first address corresponding to the first video stream;
        obtain second information about a second video stream related to the event, wherein the second information comprises second evaluation information of the second video stream and a second address corresponding to the second video stream;
        determine a first evaluation score of the first video stream based on the first evaluation information;
        determine a second evaluation score of the second video stream based on the second evaluation information;
        make a selection of the first video stream for a vehicle based on the first evaluation information, the second evaluation information, the first evaluation score, and the second evaluation score; and
        send, to the vehicle and using the communications interface, a first message comprising the first address.

15. The communications apparatus of claim 14, wherein the first evaluation information is of an image in the first video stream, and wherein the first evaluation information comprises an integrity, a deviation degree, or a resolution of the image, wherein the integrity is a ratio of a first area of an event detection region to a second area of a region of interest (ROI) in the image, and wherein the deviation degree represents a deviation of a geometric center of the event detection region from a center position of the image.

16. The communications apparatus of claim 15, wherein the first evaluation information further comprises an identifier of an image collection unit that collects the first video stream, and wherein the one or more processors are further configured to:
    obtain information about a position and a field of view of the image collection unit based on the identifier; and
    determine a matching degree between the first video stream and the vehicle based on driving route information of the vehicle or lane information of the vehicle and based on the information.

17. The communications apparatus of claim 15, wherein the first evaluation information is further of a frame of the image.

18. The communications apparatus of claim 14, wherein the one or more processors are further configured to:
    further determine the first evaluation score based on a first matching degree between the first video stream and the vehicle; and
    further determine the second evaluation score based on a second matching degree between the second video stream and the vehicle.

19. The communications apparatus of claim 14, wherein the first message further comprises information about a position at which the event occurred, a type of the event, a time at which the event occurred, or a road on which the vehicle was located when the event occurred.

20. A computer program product comprising instructions that are stored on a computer-readable medium and that, when executed by one or more processors, cause a communications apparatus to:
obtain first information about a first video stream related to an event, wherein the first information comprises first evaluation information of the first video stream and a first address corresponding to the first video stream, wherein the first evaluation information comprises an integrity, a deviation degree, or a resolution;
obtain second information about a second video stream related to the event, wherein the second information comprises second evaluation information of the second video stream and a second address corresponding to the second video stream;
make a selection of the first video stream for a vehicle based on the first evaluation information and the second evaluation information; and
send, to the vehicle, a first message comprising the first address.

21. The computer program product of claim 20, wherein the first evaluation information is of an image in the first video stream, wherein the integrity, the deviation degree, or the resolution is of the image, wherein the integrity is a ratio of a first area of an event detection region to a second area of a region of interest (ROI) in the image, and wherein the deviation degree represents a deviation of a geometric center of the event detection region from a center position of the image.

22. The computer program product of claim 21, wherein the first evaluation information is further of a frame of the image.

23. The computer program product of claim 21, wherein the first evaluation information further comprises an identifier of an image collection unit that collects the first video stream, and wherein the instructions, when executed by the one or more processors, further cause the communications apparatus to:
obtain information about a position and a field of view of the image collection unit based on the identifier; and
determine a matching degree between the first video stream and the vehicle based on driving route information of the vehicle or lane information of the vehicle and based on the information.

24. The computer program product of claim 20, wherein the instructions, when executed by the one or more processors, further cause the communications apparatus to:
determine a first evaluation score of the first video stream based on the first evaluation information; and
determine a second evaluation score of the second video stream based on the second evaluation information.

25. The computer program product of claim 24, wherein the instructions, when executed by the one or more processors, further cause the communications apparatus to:
further determine the first evaluation score based on a first matching degree between the first video stream and the vehicle; and
further determine the second evaluation score based on a second matching degree between the second video stream and the vehicle.

26. The computer program product of claim 20, wherein the first message further comprises information about a position at which the event occurred, a type of the event, a time at which the event occurred, or a road on which the vehicle was located when the event occurred.

* * * * *

UNITED STATES PATENT AND TRADEMARK OFFICE
CERTIFICATE OF CORRECTION

| | | |
|---|---|---|
| PATENT NO. | : 12,317,153 B2 | Page 1 of 1 |
| APPLICATION NO. | : 17/366760 | |
| DATED | : May 27, 2025 | |
| INVENTOR(S) | : Kai Zhou | |

It is certified that error appears in the above-identified patent and that said Letters Patent is hereby corrected as shown below:

On the Title Page

Item (71) Applicant: "Huawei Cloud Computing Technologies, Co., Ltd., Guizhou (CN)" should read "Huawei Cloud Computing Technologies Co., Ltd., Guizhou (CN)"

Signed and Sealed this
Fifteenth Day of July, 2025

Coke Morgan Stewart
*Acting Director of the United States Patent and Trademark Office*